United States Patent
Schober

(10) Patent No.: US 7,237,016 B1
(45) Date of Patent: Jun. 26, 2007

(54) METHOD AND SYSTEM TO MANAGE RESOURCE REQUESTS UTILIZING LINK-LIST QUEUES WITHIN AN ARBITER ASSOCIATED WITH AN INTERCONNECT DEVICE

(75) Inventor: Richard L. Schober, Cupertino, CA (US)

(73) Assignee: Palau Acquisition Corporation (Delaware), Santa Clara, CA (US)

( * ) Notice: Subject to any disclaimer, the term of this patent is extended or adjusted under 35 U.S.C. 154(b) by 1116 days.

(21) Appl. No.: 09/949,367

(22) Filed: Sep. 7, 2001

(51) Int. Cl.
*G06F 15/173* (2006.01)

(52) U.S. Cl. ............... 709/223; 709/226; 709/238; 718/104; 718/103

(58) Field of Classification Search ........... 709/223, 709/226, 213–215, 238; 710/240; 718/104, 718/103
See application file for complete search history.

(56) References Cited

U.S. PATENT DOCUMENTS

| | | | |
|---|---|---|---|
| 5,615,161 A | 3/1997 | Mu | |
| 5,644,604 A | 7/1997 | Larson | |
| 5,740,346 A | 4/1998 | Wicki et al. | |
| 5,768,300 A | 6/1998 | Sastry et al. | |
| 5,838,684 A | 11/1998 | Wicki et al. | |
| 5,875,309 A * | 2/1999 | Itkowsky et al. | 710/113 |
| 5,892,766 A | 4/1999 | Wicki et al. | |
| 5,931,967 A | 8/1999 | Shimizu et al. | |
| 5,941,979 A * | 8/1999 | Lentz et al. | 710/316 |
| 5,959,995 A | 9/1999 | Wicki et al. | |
| 5,987,629 A | 11/1999 | Sastry et al. | |
| 5,991,296 A | 11/1999 | Mu et al. | |
| 6,003,064 A | 12/1999 | Wicki et al. | |
| 6,122,714 A * | 9/2000 | VanDoren et al. | 711/150 |
| 6,425,032 B1 * | 7/2002 | Prasanna | 710/117 |
| 6,445,680 B1 * | 9/2002 | Moyal | 370/236 |
| 6,532,509 B1 * | 3/2003 | Wolrich et al. | 710/240 |
| 6,628,662 B1 * | 9/2003 | Blackmon et al. | 370/447 |
| 6,631,419 B1 * | 10/2003 | Greene | 709/238 |
| 6,661,788 B2 * | 12/2003 | Angle et al. | 370/390 |
| 6,922,749 B1 * | 7/2005 | Gil et al. | 710/316 |

OTHER PUBLICATIONS

InfiniBand Architecture Specification, General Specification, Oct. 24, 2000, pp. 880, vol. 1.
"InfiniBand Switch Chip Runs at 10 Gbps On Eight Ports", Nicholas Cravotta, Nov. 8, 2001, EDN, 1 page.
"Assemble Fast Switch Fabrics With 32-Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.

(Continued)

*Primary Examiner*—Philip B. Tran
(74) *Attorney, Agent, or Firm*—Anne Kinsman; Borden Ladner Gervais LLP

(57) ABSTRACT

A method to manage resource requests within an arbiter associated with an interconnect device includes identifying a first resource, required to issue a grant responsive to a resource request. If the first resource is unavailable, the resource request is placed within a first queue associated with the first resource. The first queue is a queue within a first group of queues for a first resource type of the first resource. A second group of queues is maintained for a second resource type.

24 Claims, 30 Drawing Sheets

OTHER PUBLICATIONS

"RedSwitch Gearing Up To Launch New Chip", Steve Tanner, Silicon Valley Business Ink, Oct. 26, 2001, 3 pages.

"Mellanox Integrates Serdes Into Infiniband Switch", Jerry Ascierto, EE Times, Oct. 23, 2001, 3 pages.

"Switch Chip Expands InfiniBand Integration", EEM File 3130, Tony Chance, 2 pages.

"RedSwitch Announces 16 Gbyte/s Throughout Switch Product for RapidIO Architecture", RedSwitch Press Release, Milpitas, Calif., May 15, 2001, Tony Chance,May 15, 2001, 2 pages.

"RedSwitch and Agilent Technologies Unveil 160-GB/s Throughout Switch Product for InfiniBand Architecture", RedSwitch Press Release, Intel Developer Forum Conference, San Jose, Calif., Feb. 27, 2001, Mark Alden-Agilent, Tony Chance-RedSwitch, 2 pages.

* cited by examiner

METHOD AND SYSTEM TO MANAGE RESOURCE REQUESTS UTILIZING LINK-LIST QUEUES WITHIN AN ARBITER ASSOCIATED WITH AN INTERCONNECT DEVICE

FIELD OF THE INVENTION

The present invention relates generally to the field of data communications and, more specifically, to an arbitration mechanism for arbitrating between requests competing for a group of resources, for example, of an interconnect device in a communications network.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few. The physical properties of the IBA interconnect technology have been designed to support both module-to-module (board) interconnects (e.g., computer systems that support I/O module add in slots) and chasis-to-chasis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

SUMMARY OF THE INVENTION

According to a first aspect of the present invention, there is provided a method to manage resource requests within an arbiter associated with an interconnect device. A first resource, required to issue a grant responsive to a resource request, is identified. If the first resource is unavailable, the resource request is placed within a first queue associated with the first resource. The first queue is a queue within a first group of queues for a first resource type of the first resource. A second group of queues is maintained for a second resource type.

According to a second aspect of the invention, there is provided a queue system to manage resource requests within an arbiter associated with an interconnect device. The queue system includes a memory, associated with the arbiter, to maintain first and second groups of queues of requests for which first and second resource types respectively are outstanding. The queue system further includes a resource allocator to identifying a resource required to issue a grant responsive to a resource request, to place the resource request within a first queue associated with a first resource if the first resource is unavailable, and to place the resource request within a second queue associated with a second resource if the second resource is unavailable. The first queue is a queue within the first group of queues for the first resource type. The second queue is a queue within the second group of queues for the second resource type.

According to a further aspect of the present invention there is provided an arbiter to arbitrate resource requests for resources of an interconnect device. The arbiter includes a request processor to issue a resource grant responsive to a resource request and a queue mechanism to allocate the resource request to one of a plurality of queue groups, each queue group being associated with a respective resource type. The arbiter further includes a plurality of request selectors, each request selector being associated with a respective queue group of the plurality of queue groups and being to select a selected resource request from the associated queue group for processing by the request processor.

According to an even further aspect of the present invention, there is provided a method to arbitrate resource requests for resources of an interconnect device. A resource request, received at an arbiter associated with the interconnect device, is allocated to one of a plurality of queue groups based on resource availability, each queue group being associated with a respective resource type and the resource request allocated to a queue group for which a resource of the associated resource type is unavailable for allocation to the resource request at a time of allocation. A plurality of request selectors are operated, each request selector being associated with a respective queue group of the plurality of queue groups and being to select a selected resource request from the associated queue group for processing by the request processor.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to manage resource requests within an arbiter associated with an interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 1:
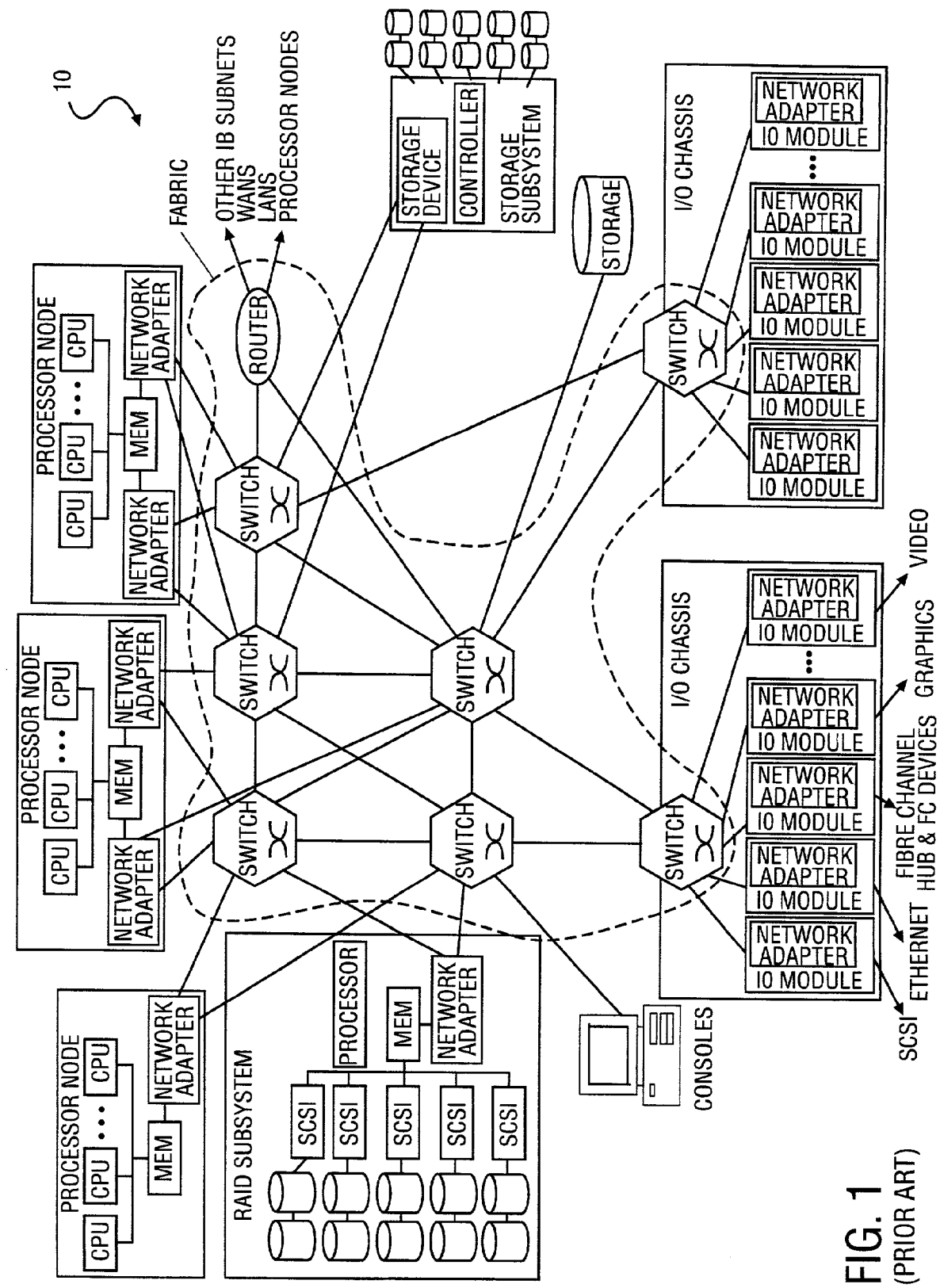
FIG. 1 is a diagrammatic representation of a System Area Network, according to the prior art, as supported by a switch fabric.
Figure 2A:
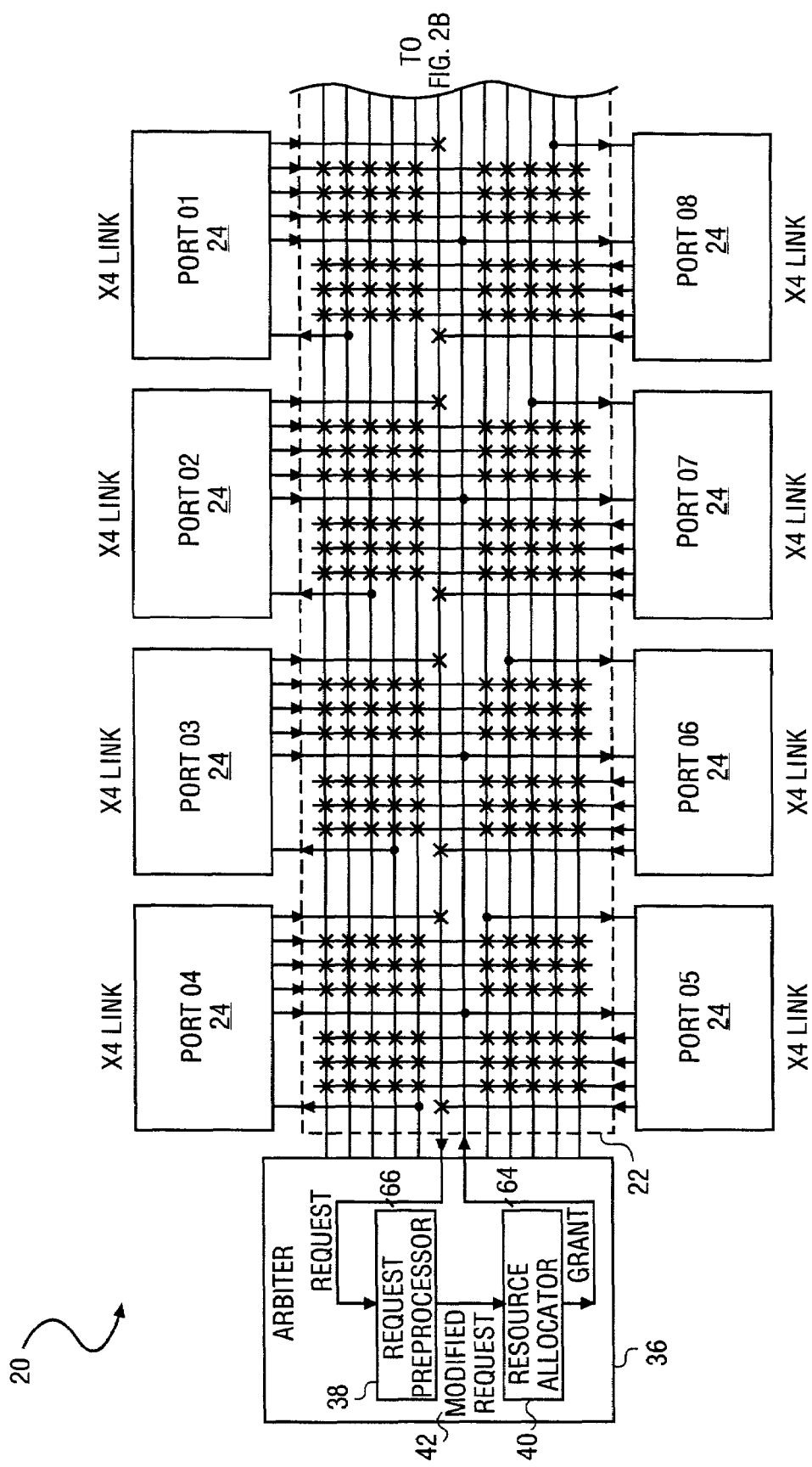
FIGS. 2A and 2B provide a diagrammatic representation of a data path, according to an exemplary embodiment of the present invention, implemented within an interconnect device (e.g., a switch).
Figure 2B:
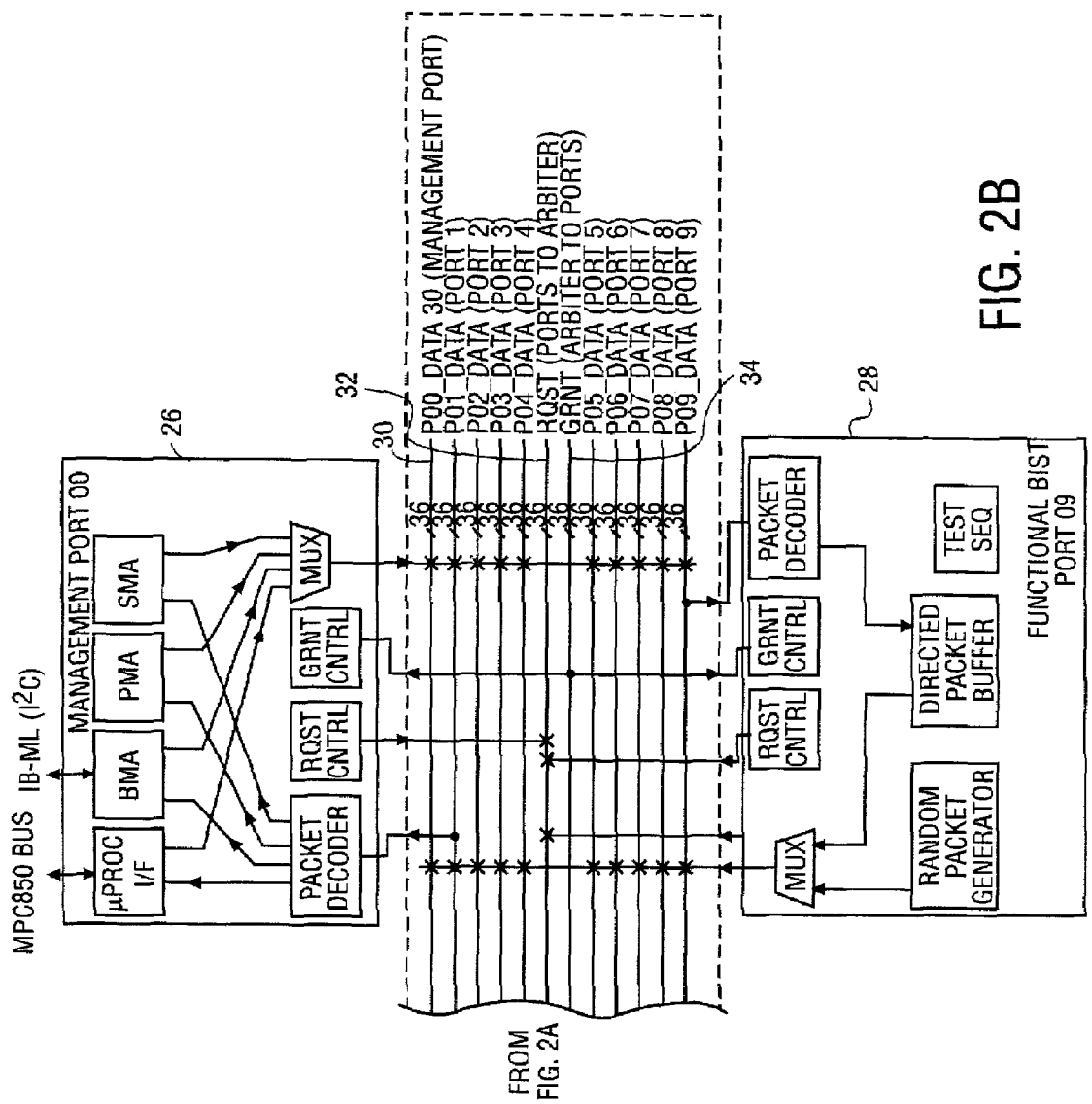

FIGS. 2A and 2B provide a diagrammatic representation of a datapath 20, according to an exemplary embodiment of the present invention, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar are eight communication ports 24 that issue resource requests to an arbiter 36 via the request bus 32, and that receive resource grants from the arbiter 36 via the grant bus 34.

The arbiter 36 includes a request preprocessor 38 to receive resource requests from the request bus 32 and to generate a modified resource request 42 to a resource allocator 40. The resource allocator 40 then issues a resource grant on the grant bus 34. Further details regarding the arbiter 36 will be discussed in detail below.

In addition to the eight communication ports, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

The functional BIST port 28 supports stand-alone, at-speed testing of an interconnect device embodying the datapath 20. The functional BIST port 28 includes a random packet generator, a directed packet buffer and a return packet checker.

Figure 3:
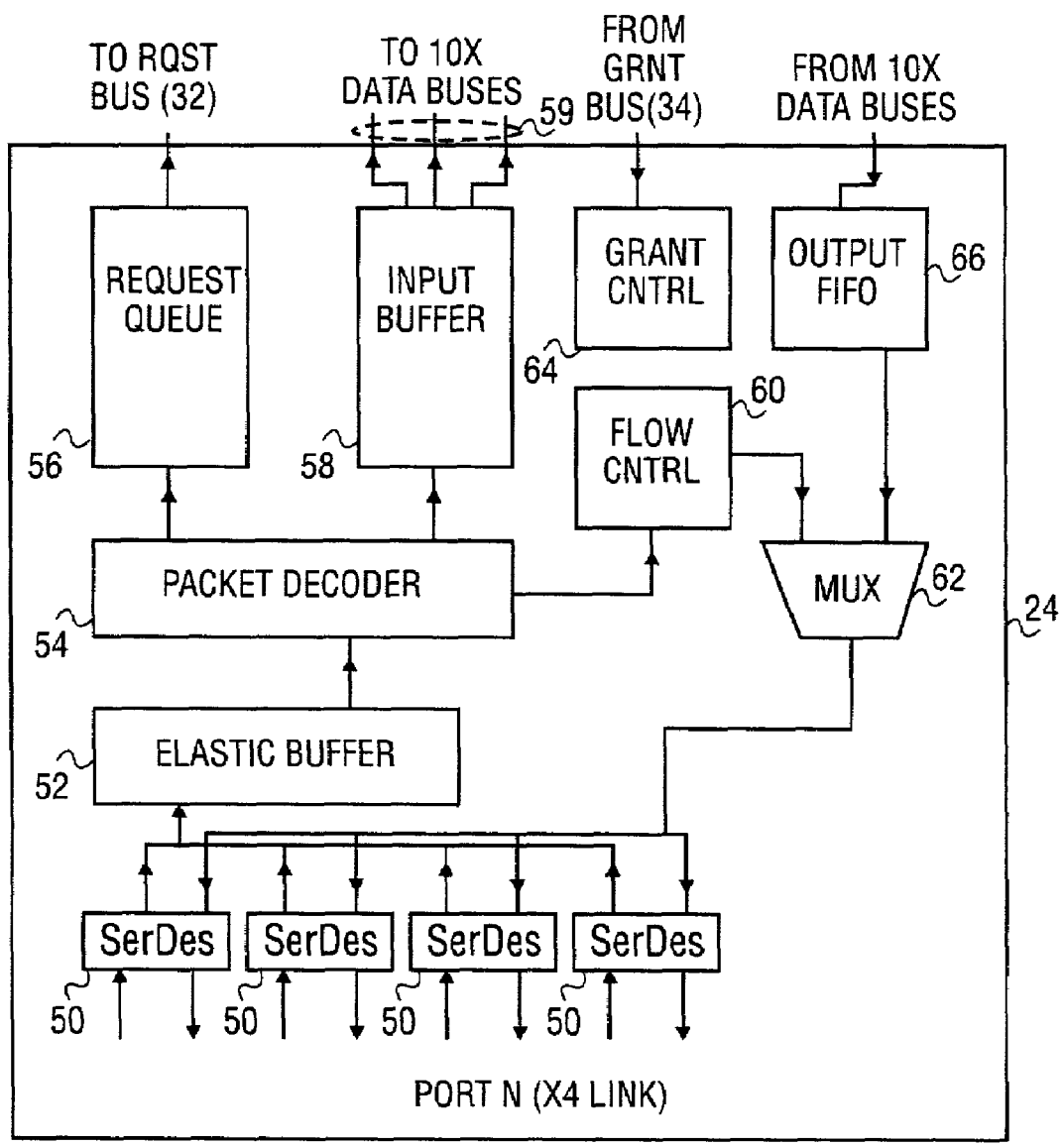
FIG. 3 is a diagrammatic representation of communications port, according to an exemplary embodiment of the present invention, that may be employed within a data path 20.

Turning now to the communication ports 24, FIG. 3 is a block diagram providing further architectural details of an exemplary communications port 24 as may be implemented within the datapath 20. While the datapath 20 of FIGS. 2A and 2B are shown to include eight ×4 duplex communication ports 24, the present invention is not limited to such a configuration. Referring specifically to FIG. 3, each communications port 24 is shown to include four Serializer-Deserializer circuits (SerDes's) 50 via which 32-bit words are received at and transmitted from a port 24. Each SerDes 50 operates to convert a serial, coded (8B10B) data bit stream into parallel byte streams, which include data and control symbols. Data received via the SerDes's 50 at the port 24 is communicated as a 32-bit word to an elastic buffer 52. The elastic buffer 52 has two primary functions, namely:

(1) To accommodate frequency differences (within a specified tolerance) between clocks recovered from an incoming bit stream and a clock local to the data path 20; and (2) To accommodate skew between symbols being received at the data path 20 on four serial data channels.

Incoming data is further synchronized with a core clock as it is propagated through the elastic buffer 52.

Figure 4:
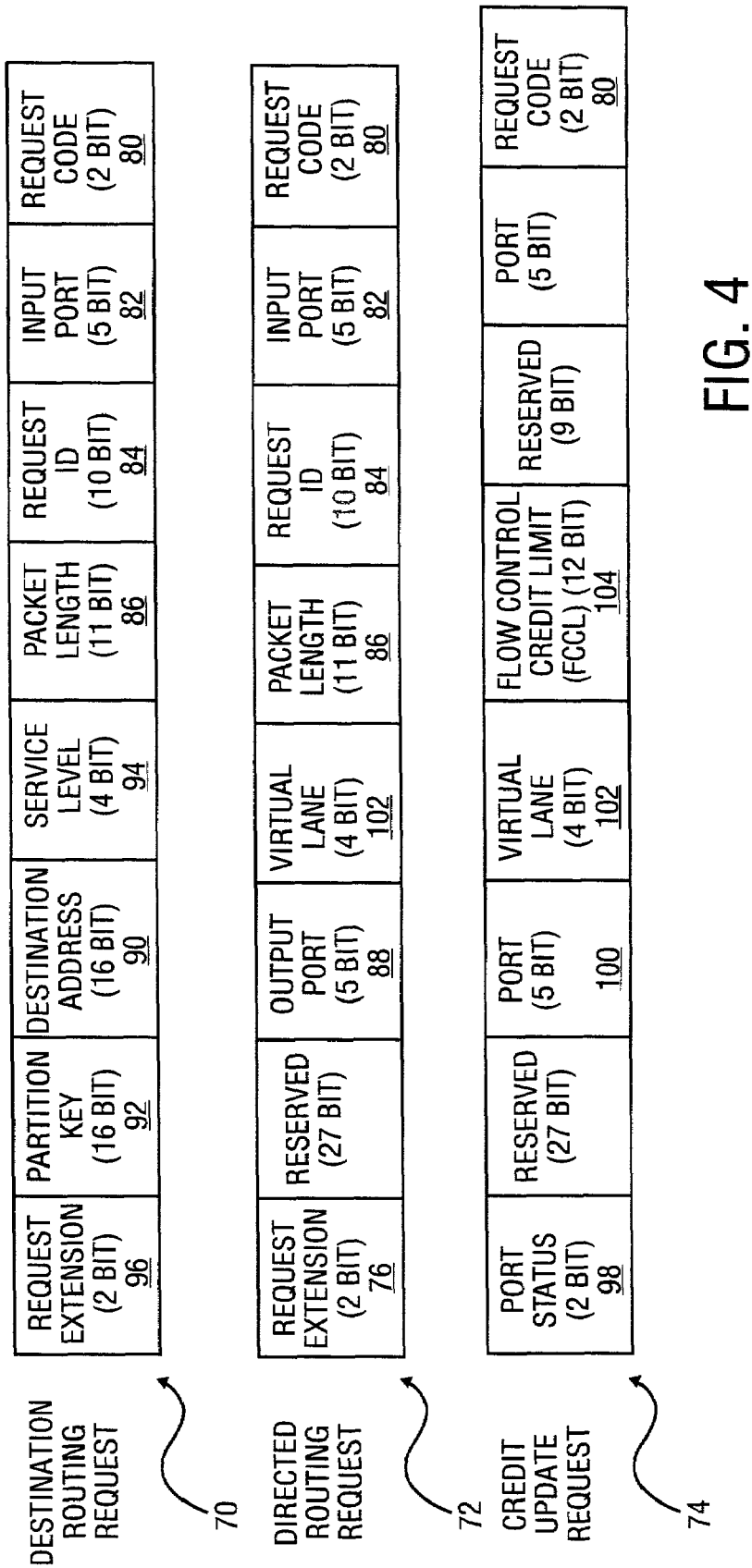
FIG. 4 illustrates exemplary packet transfer requests and an exemplary credit update request.

From the elastic buffer 52, packets are communicated to a packet decoder 54 that generates a request, associated with a packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 4 illustrates two examples of packet transfer requests, namely a destination routing request 70 and a direct routing request 72. An exemplary credit update request 74 is also shown.

Return to FIG. 3, each communications port 24 is also shown to include a 20 Kbyte input buffer 58, the capacity of which is divided equally among data virtual lanes (VLs) supported by the datapath 20. Virtual lanes are, in one embodiment, independent data streams that are supported by a common physical link. Further details regarding the concept of "virtual lanes" is provided in the InfiniBand™ Architecture Specification, Volume 1, Oct. 24, 2000.

The input buffer 58 of each port 24 is organized into 64-byte blocks, and a packet may occupy any arbitrary set of buffer blocks. A link list keeps track of packets and free blocks within the input buffer 58.

Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the Ser Des 50 to other ports 24. Further details regarding an exemplary credit-based flow control are provided in the InfiniBand™ Architecture Specification, Volume 1.

Figure 7:
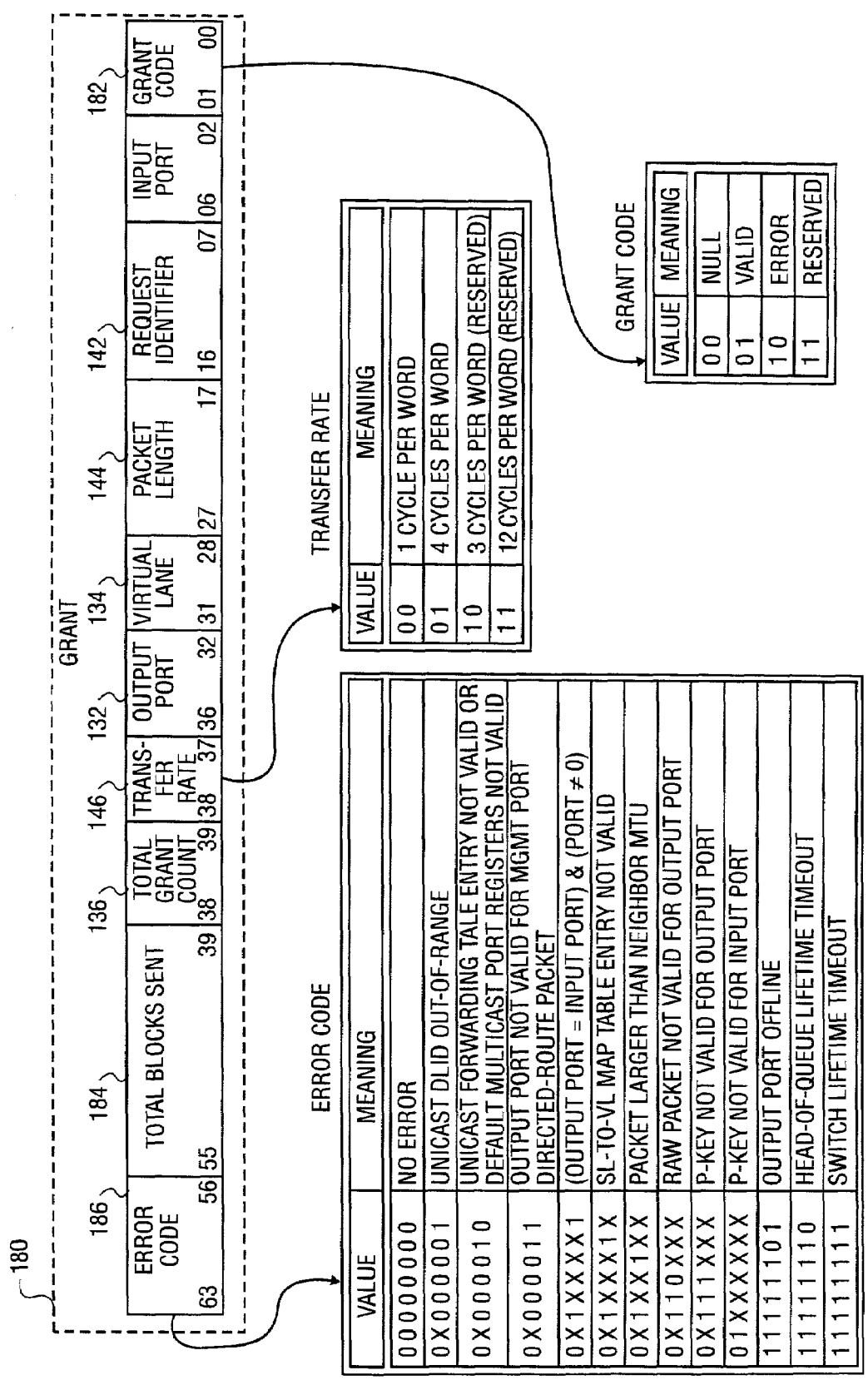
FIG. 7 illustrates an exemplary grant that may be issued responsive to any one of the requests discussed in the present application.

The communications port 24 also includes a grant controller 64 to receive resource grants 180 from the arbiter 36 via the grant bus 34. FIG. 7 provides an example of a grant 180.

An output FIFO 66 has sufficient capacity to hold a maximum-sized packet, according to a communications protocol supported by the datapath 20. The output FIFO 66 provides elasticity for the insertion of inter-frame symbols, and flow control messages, between packets. The output FIFO 66 furthermore provides speed matching for moving packets from ×4 to ×1 ports.

Returning to FIG. 4, within the routing requests 70 and 72, a request code 80 is a 2-bit value identifying the request type, an input port identifier 82 identifies a port 24 from which the request was issued, a request identifier 84 is a "handle" or identifier for a request that allows the grant controller 64 of a port to associate a grant with a specific packet. For example, the request identifier 84 may be a pointer to a location within the input buffer 58 of a communications port 24. The request identifier 84 is necessary as a particular port may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packets should be directed. In lieu of an output port identifier 88, the destination routing request 70 includes a destination address 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subset management packet (VL15), a raw (e.g., non-Infiniband) packet, or a standard packet where the partition key is valid/invalid.

The exemplary credit update request 74 includes a port status identifier 98 that indicates whether an associated port, identified by the port identifier 100, is online and, if so, the link width (e.g., 12×, 4× or 1×). Each credit update request 74 also includes a virtual lane identifier 102 and a flow control credit limit 104.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) the remote receiver is capable of receiving (or 2048 if the number exceeds 2048) on the given virtual lane.

To compute the number of available credits, the resource allocator 40 subtracts the total number of blocks sent on the relevant virtual lane (modulo 4096). This computation counts for packets that have been sent after the remote receiver sent a flow control message, thus making the credit forwarding mechanism tolerant of link delays. The effective computation is:

Available Credits=Reported Credits−(value of total blocks sent−remote value of total blocks received).

Arbiter

Figure 5:
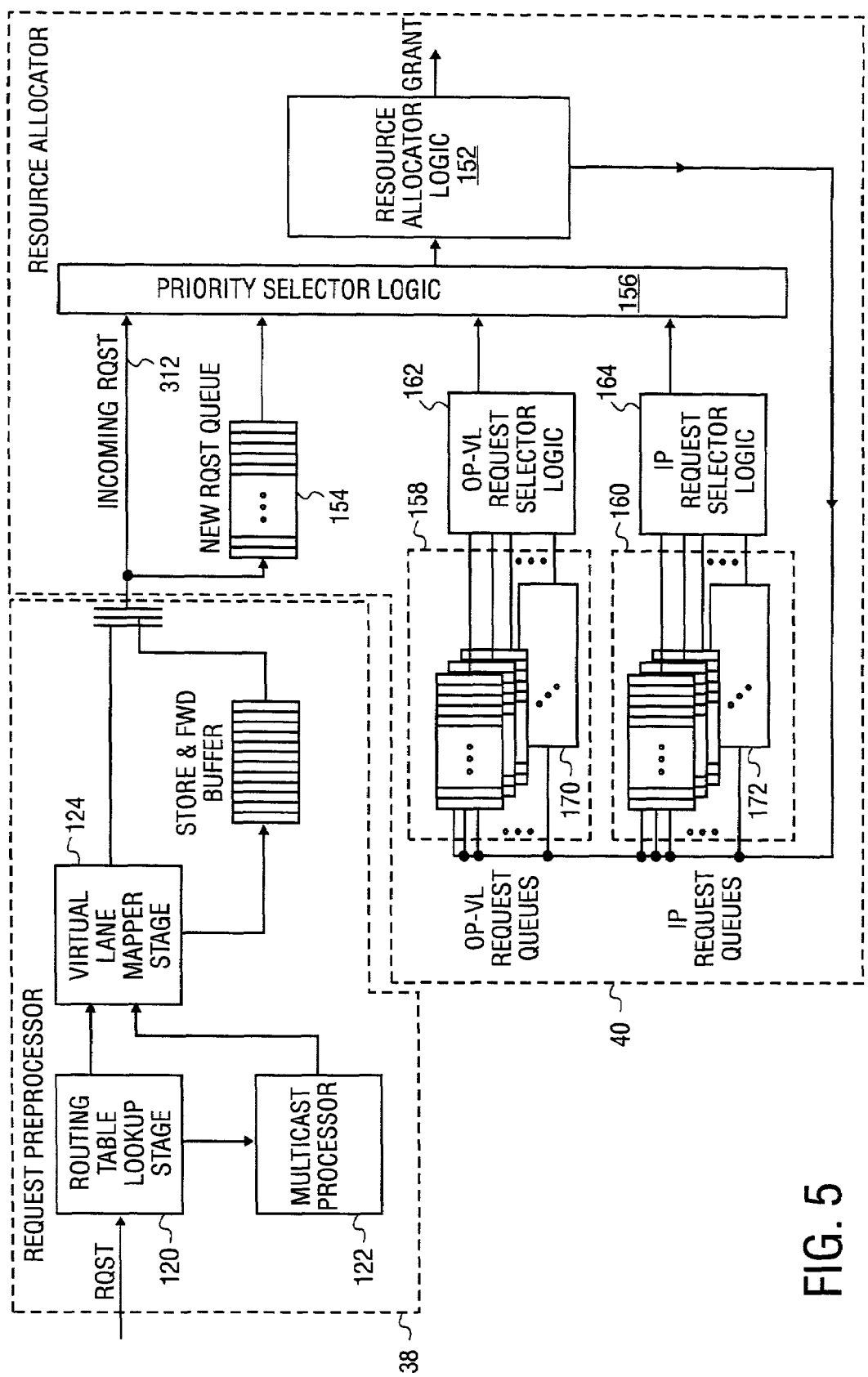
FIG. 5 is a block diagram illustrating the conceptual architecture of an arbiter, according to an exemplary embodiment of the present invention.

FIG. 5 is a conceptual block diagram of the arbiter 36, according to an exemplary embodiment of the present invention. The arbiter 36 is shown to include the request preprocessor 38 and the resource allocator 40. As discussed above, the arbiter 36 implements a central arbitration scheme within the datapath 20, in that all requests and resource information are brought to a single location (i.e., the arbiter 36). This offers certain advantages in that a central, consolidated view of resource availability and demand allow efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival with a rate of less than one packet per clock cycle. Again, in deployments where the average packet arrival rate is greater than one packet per clock cycle, the teachings of the present invention may be employed within an arbiter that implements parallel arbitration.

Dealing first with the request preprocessor 38, a request (e.g., a destination routing, direct routing or credit update request 70, 72 or 74) is received on the request bus 32 at a routing table lookup stage 120 that includes both unicast and multicast routing tables (not shown). Specifically, a packet's destination address 90 is utilized to perform a lookup on both the unicast and multicast routing tables. If the destination address is for a unicast address, the destination address 90 is translated to an output port number. On the other hand, if the destination is for a multicast group, a multicast processor 122 spawns multiple unicast requests based on a lookup in the multicast routing table.

From the routing table lookup stage 120, a request is forwarded to a virtual lane mapper stage 124 where a request's service level identifier 94, input port identifier 82 and output port identifier 132 (determined at stage 120) are utilized to perform a lookup in a virtual lane map (not shown) and to output a virtual lane identifier.

Figure 6:
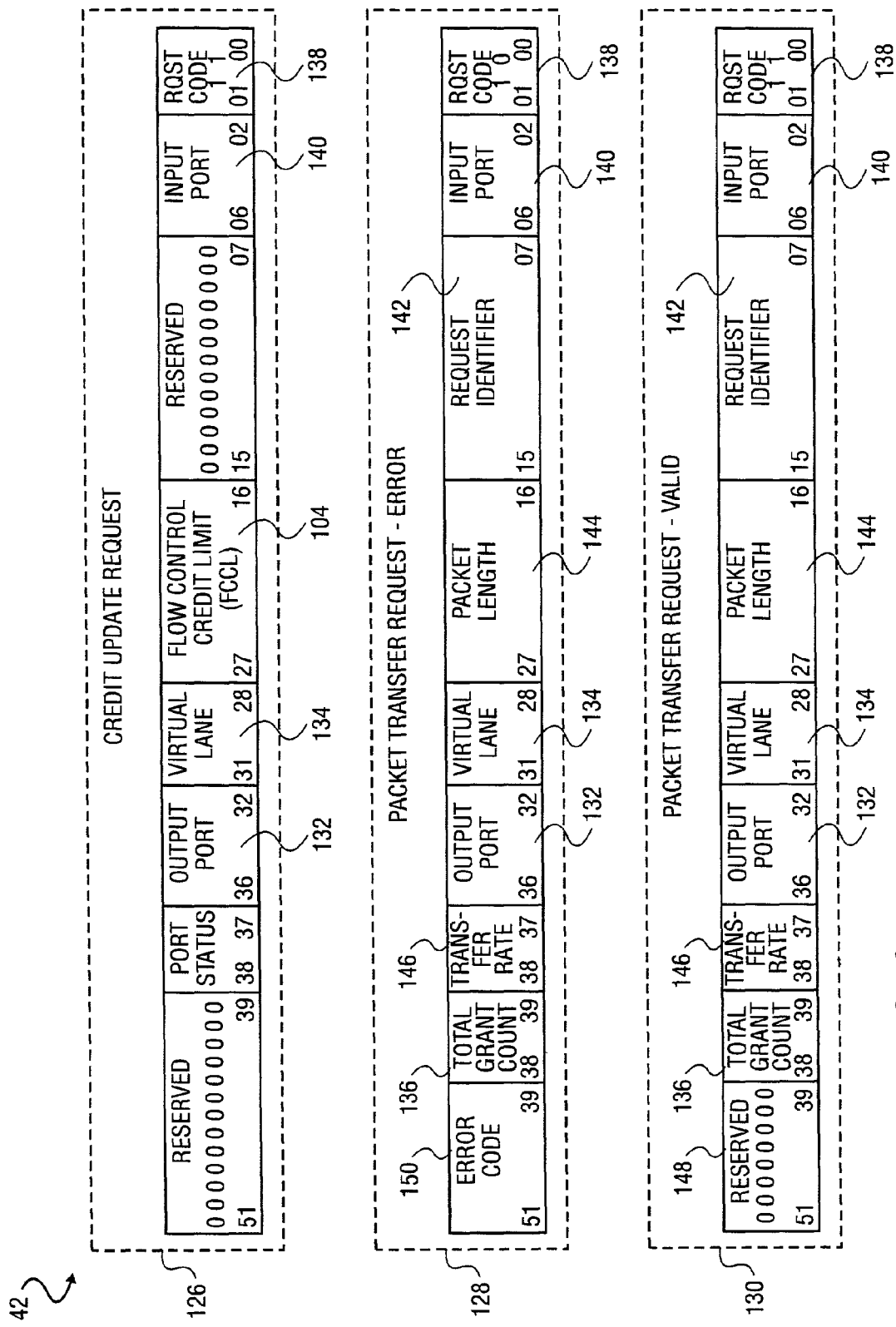
FIG. 6 provides representations of exemplary modified resource requests that may be outputted from a request preprocessor to a request allocator of the arbiter illustrated in FIG. 5.

Accordingly, the output of the request preprocessor 38 is a modified request that is derived from a request, such as any of those shown in FIG. 4. FIG. 6 is a diagrammatic representation of exemplary modified resource requests 42 that may be outputted from the request preprocessor 38 to the resource allocator 40. Taking a valid packet transfer request 130 as an example, it will be noted that this request 130 includes an output port identifier 132 generated at the routing table lookup stage 120 and a virtual lane identifier 134 generated at the virtual lane mapper stage 124.

A total grant count value 136 is also included within the request 130. The total grant count value 136 is generated at the routing table lookup stage 120, and is utilized to track multicast requests.

Other fields within the valid package transfer request 130 include a request code 138 that identifies request type and input port identifier 140 that identifies the port 24 from which the request originated, a request identifier 142 that uniquely identifies the request, a packet length value 144 that indicates the number of 4-byte words within a packet, a transfer rate value 146 that identifies the speed at which the packet will be sent through the crossbar 22 of the datapath 20 and a reserved field 148.

The error package transfer request 128 is similar to the request 130, but includes an error code 150 that identifies a unique error usually detected within the request preprocessor, but sometimes detected in the resource allocator 40.

The credit update request 126 is shown to include substantially the same information as the credit update request 74 illustrated in FIG. 4.

Returning to FIG. 5, a modified incoming request (e.g., a modified resource request 42 such as any of the requests 126, 128 or 130) 312 is received at the resource allocator 40 from the request preprocessor 38. An incoming (or just-arrived) modified request 312 may proceed directly to resource allocator logic 152, if there is no contention with further pending requests stored in a new request queue 154 that are awaiting processing by the resource allocator logic 152. If such contention does exist, an incoming modified request 312 is placed at the back of the new request queue 154.

As stated above, FIG. 5 is a conceptual diagram of the arbiter 36, and the various queues and selectors described above may not be physically implemented as discrete components or logic blocks. For example, the request queues discussed below and above are, in one embodiment, each implemented as link lists within a single pending request buffer. Nonetheless, for a conceptual understanding of the present invention, it is useful to make reference to FIG. 5.

The resource allocator 40 is shown to include priority selector logic 156 that implements a priority scheme to feed resource requests from one of four sources to the resource allocator logic 152. The four sources from which the priority selector logic 156 selects a resource request are: (1) an incoming request 312; (2) the new request queue 154; (3) a group 158 of output port-virtual lane (OP-VL) request queues 170; and (4) a group 160 of input port (IP) request queues 172. The group 158 of output port-virtual lane (OP-VL) request queues 158 has output port-virtual lane (OP to-VL) request selector logic 162 associated therewith for performing a selection of requests from within the group 158 of queues for presentation to the priority selector logic 156. Similarly, the group 160 of input port (IP) request queues has input port request selector logic 164 associated therewith to select a request for presentation to the priority selector logic 156. Further details regarding the population of the groups 158 and 160 of queues with requests will be provided below. It will be noted that two levels of selection logic are employed for these groups of queues. A first level of selection logic is employed to select requests from a group 158 or 160 of queues associated with a first resource type (e.g., output port-virtual lane combinations), each queue being associated with a specific instance of the resource type. A second level of selection logic is employed to select between requests that emerge from each group of queues based on a priority scheme.

At a high level, the arbiter 36 employs a two-level allocation policy. The first level of the allocation policy combines flow control credits and port availability in an "all-or-nothing" allocation policy. Considering a request received at the resource allocator logic 152 from the priority selector logic 156, if (1) sufficient flow control credits for a virtual lane identified by the virtual lane identifier 134 of the request are available and (2) if an output port identified by the output port identifier 132 of the request is available, then both the virtual lane and output port identified within the relevant request are allocated to the request by the resource allocator logic 152.

On the other hand, if either insufficient flow control credits for a virtual lane, or the output port itself, are currently unavailable, then no resources (i.e., neither the virtual lane nor the output port) are allocated, and then request is placed at the back of an output port-virtual lane (OP-VL) request queue 170 corresponding to the requested output port and virtual lane.

The second level of the allocation policy is for input buffer read port availability. As this is the second level of the allocation policy, a request must first acquire flow control credits for a virtual lane and a target output port before an input read buffer port is committed by the resource allocator logic 152. Accordingly, once a virtual lane and target output port have been allocated, if an input read buffer port is not available, the relevant request is put on the back of an input port (IP) request queue 172 corresponding to an input port identified within the relevant request by the input port identifier 140.

The output port-virtual lane request selector logic 162 monitors each of the request queues 170 within the group 158 of output port-virtual lane request queues. As flow control credits and output ports become available, the selector logic 162 chooses among pending requests in the group 158 of queues. In an exemplary embodiment of the present invention where the arbiter 36 supports the InfiniBand™ Architecture, the output port-virtual lane request selector logic 162 may implement the InfiniBand VL arbitration scheme.

Similarly, the input port request selector logic 164 monitors each of the input port request queues 172 within the group 160 as input buffers 58 become available. The selector logic 164 chooses among pending requests utilizing, for example, a simple round-robin selection policy.

Upon the availability of all resources required to satisfy a particular request, the resource allocator logic 152 will issue a grant 180, on the grant bus 34. FIG. 7 illustrates the content of an exemplary grant 180. The grant 180 contains a number of fields in common with a request, as well as an additional grant code 182, a total blocks sent field 184, and an error code field 186.

Figure 8:
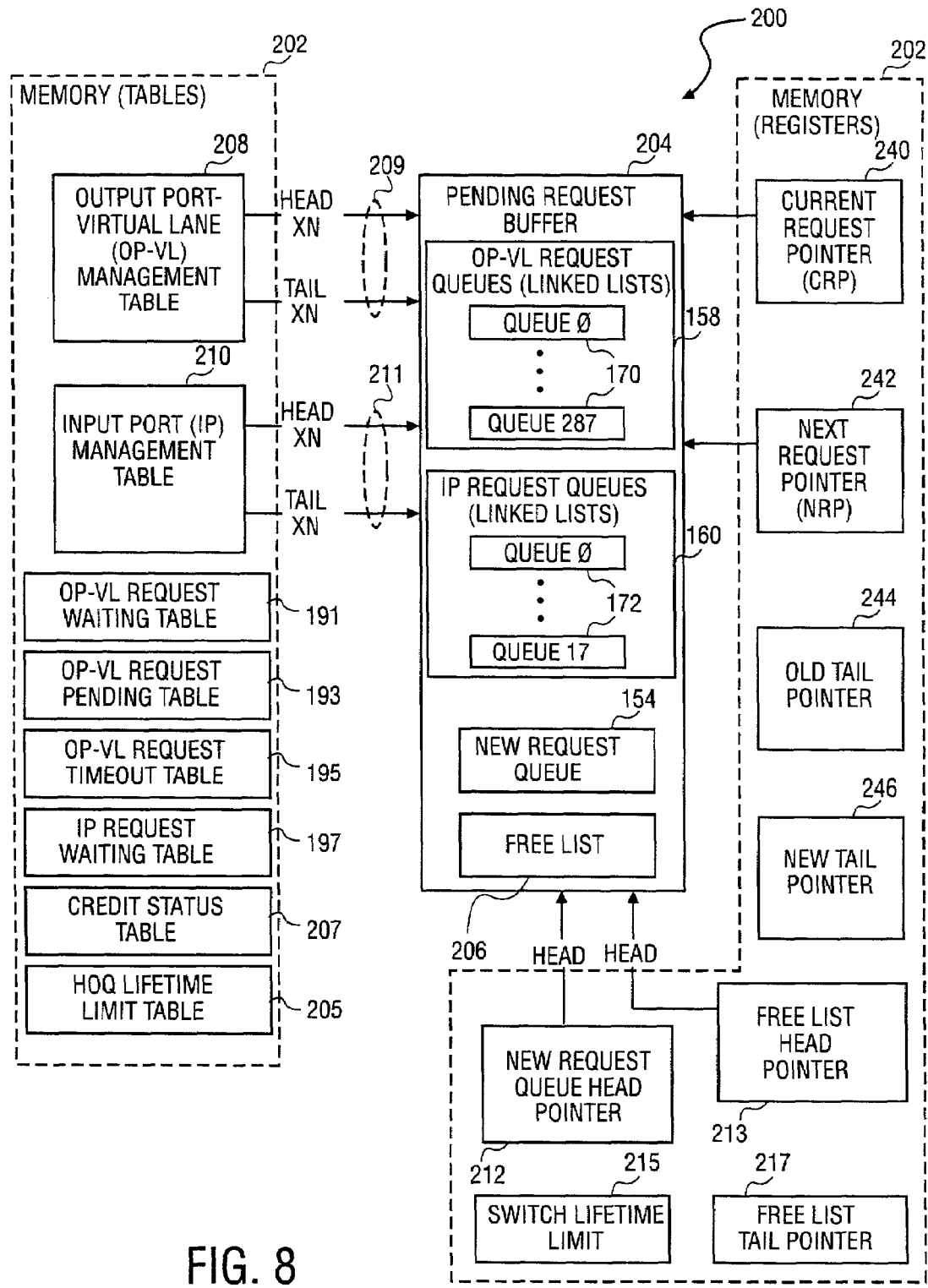
FIG. 8 is a block diagram illustrating a physical architecture of a pending request handler, according to an exemplary embodiment of the present invention, that includes a memory (e.g., a RAM) and a pending request buffer.

As stated above, FIG. 5 provides a conceptual diagram of the various request queues that may be maintained in the arbiter 36. FIG. 8 is a block diagram illustrating the physical architecture of a pending request handler 200, according to an exemplary embodiment of the present invention, that includes a memory 202 (e.g., a collection of Random Access Memories (RAM s) and registers) and a pending request buffer 204. At a high level, all requests received at the resource allocator 40 from the request preprocessor 38 are stored within the pending request buffer 204 until grant. In one embodiment, the pending request buffer 204 maintains multiple groups of queues, each group of queues being dedicated to a specific resource type. Accordingly, each group of queues is constituted by queues associated with a specific instance of a relevant resource type (e.g., ports, virtual lanes, etc.). In the exemplary embodiment, the pending request buffer 204 is shown to store the group 158 of output port-virtual lane (OP-VL) request queues 170, the group 160 of input port (IP) request queues 172, the new request queue 154 and a free list 206. Each queue within the pending request buffer 204 is furthermore maintained as a link list, in that each entry includes a pointer to at least a next (or preceding) entry of the relevant queue.

A number of tables for managing the queues maintained within the pending request buffer 204 are shown to be implemented within the memory 202. Specifically an output port-virtual lane (OP-VL) management table 208 maintains a head and tail pointer for each of the OP-VL request queues 170 of the group 158, an input port (IP) management table 210 stores head and tail pointers for each of the IP request queues 172 of the group 160, a single register stores a new request queue head pointer 212 to the head of the new request queue 154.

Figure 9:
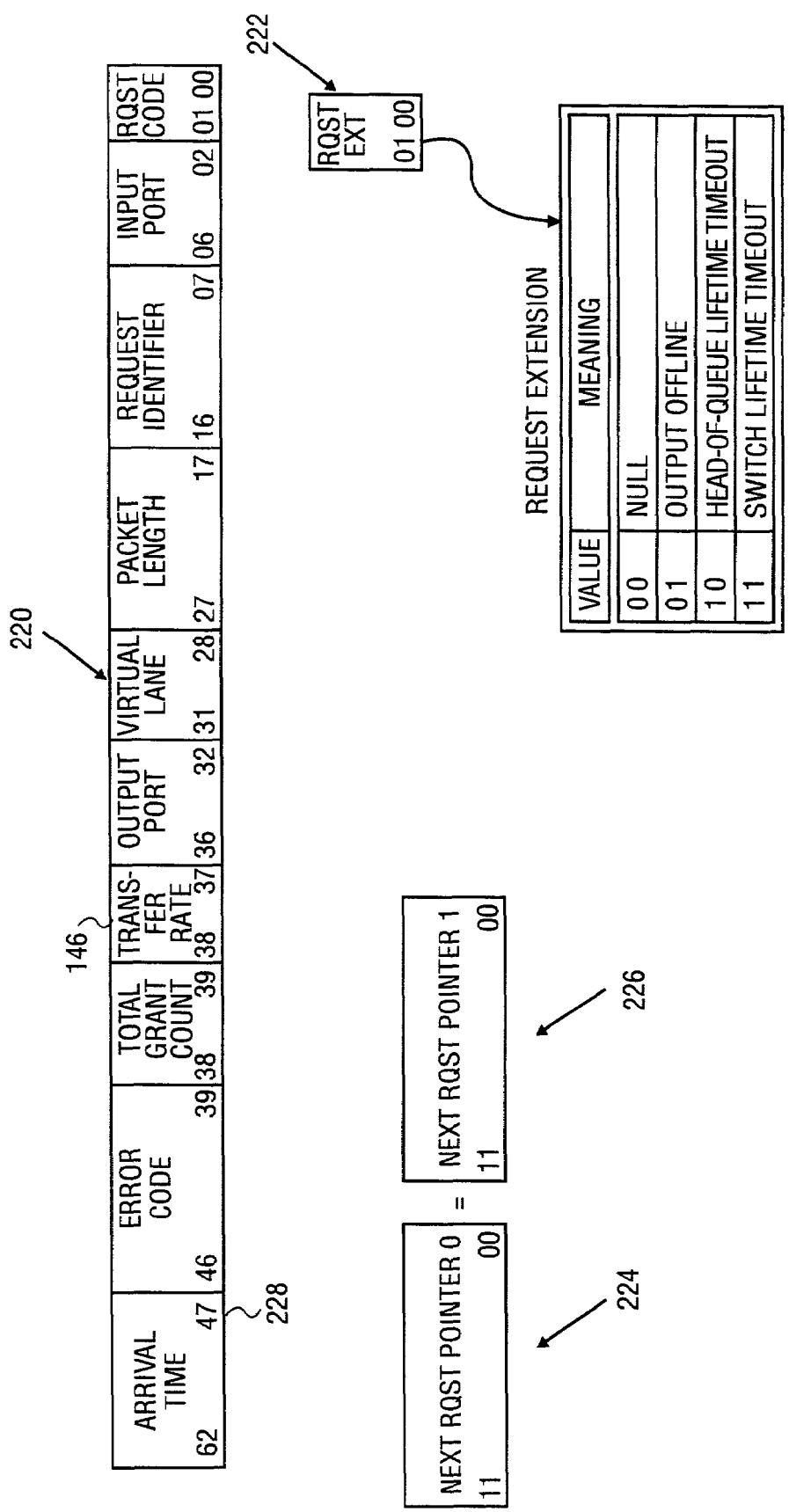
FIG. 9 is a field diagram illustrating fields that may be implemented within each entry of an exemplary pending request buffer.

Dealing now specifically now with the pending request buffer 204, FIG. 9 is a field diagram illustrating fields that may be implemented within each entry within the pending request buffer 204, according to an exemplary embodiment of the present invention. It should be noted that the pending request buffer 204 holds all requests received at the resource allocator 40 and may include 1024 entries to support the datapath 20 illustrated in FIG. 2, when employed in an InfiniBand compliant environment. However, it will be appreciated that where a number of ports and the deployment environment vary, the number of entries may be varied accordingly.

The fields of the pending request buffer 204 illustrated in FIG. 9 are divided into four banks, namely: (1) a request bank 220; (2) a request extension bank 222; (3) a next request pointer 0 bank 224; and (4) a next request pointer 1 bank 226. The request bank 220 stores the content of each request as received from the request preprocessor 38, the request extension bank 222 stores codes for errors detected by the resource allocator 40, the next request pointer 0 bank is utilized for reading a next entry in a relevant request queue (e.g., an OP-VL, an IP or the new request queue), and the next request pointer 1 bank 226 is utilized for reading a next entry in a free list 206, which is shown in FIG. 8 to be maintained within the pending request buffer 204.

The request bank 220 includes an arrival time field 228 that records a request arrival time within the pending request buffer 204.

Figure 10A:
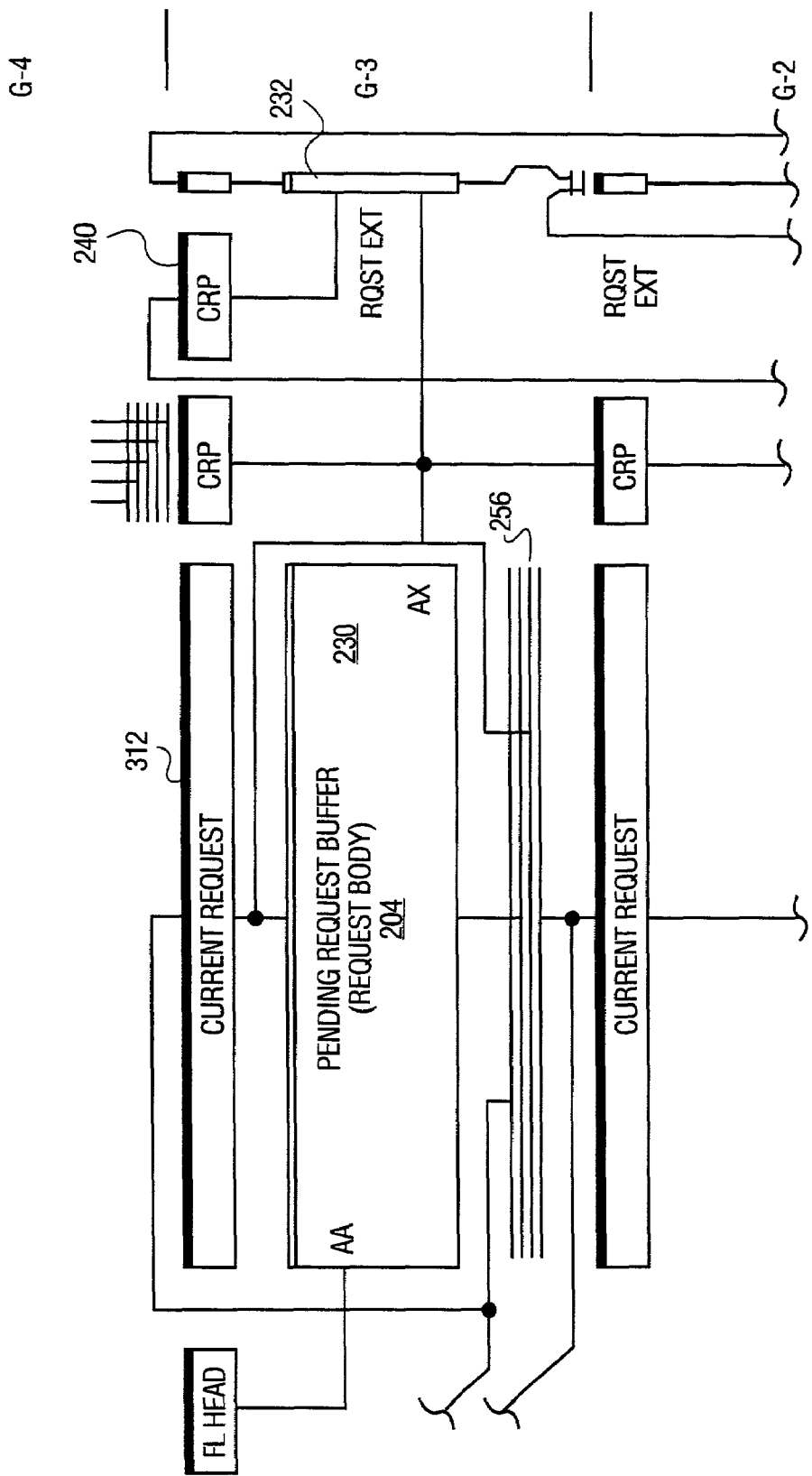
FIGS. 10A–10B provide a pipestage representation of a pending request buffer, according to an exemplary embodiment of the present embodiment of the present invention.
Figure 10B:
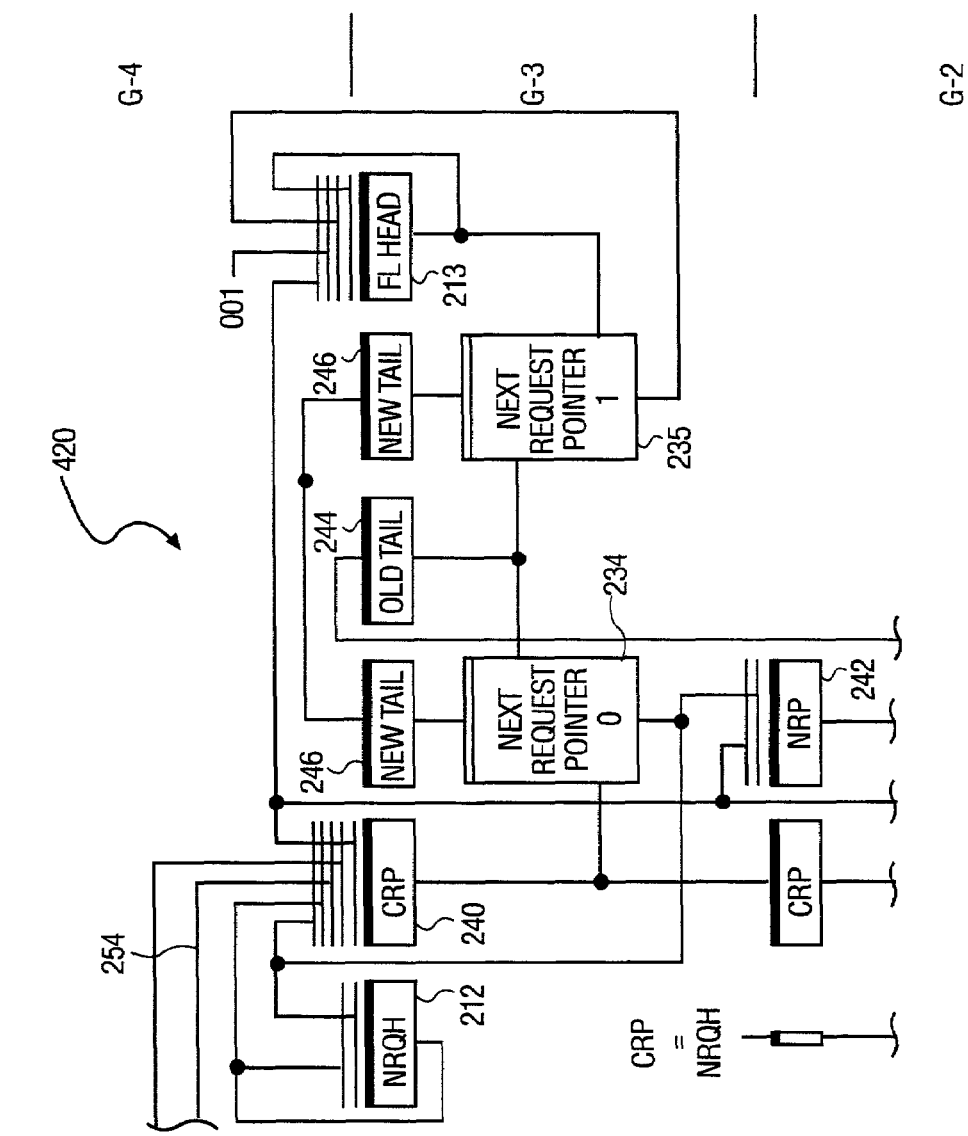

FIGS. 10A–10B provide a pipestage representation of the pending request buffer 204, according to one embodiment of the present invention. In this embodiment, the pending request buffer 204 is partitioned into four Static Random Access Memories (SRAMs) to facilitate different access patterns to different data fields. A first SRAM 230 is shown to hold the request information that constitutes the request bank 220, identified in FIG. 9. A second SRAM 232 holds the request extension 222, shown in FIG. 9. Third and fourth SRAMs 234 and 235 hold the next request pointer 0 and the next request pointer 1 in banks 224 and 226, identified in FIG. 9. A current request pointer (CRP) 240, identified in FIGS. 10A and 10B is also maintained within the memory 202. The current request pointer 240 is a pending request buffer read address for requests within the pending request buffer 204. The current request pointer 240 must be equal to a request head pointer (as contained within 208, 210 and 212 of FIG. 8). A next request pointer (NRP) 242 is also maintained within the memory 202, and comprises a pending request buffer address of the next request in a queue that contains the request identified by the current request pointer 240. The next request pointer 242 is only valid if there is more than one entry in the relevant queue.

Other request pointers maintained within the memory 202 include a old tail pointer 244 that is the pending request buffer address of the last request in a queue before an enqueue, and a new tail pointer 246 that is the pending request buffer address of the last request after an enqueue. Further details regarding pointer processing shall be provided below.

Returning again to FIGS. 10A and 10B, an overview of the process whereby a request is written into the pending request buffer 204 will now be provided.

Incoming requests 312 are written into the pending request buffer 204, and specifically into an entry of the SRAM 230, at the head of the free list 206. The request's arrival time is recorded in an arrival time field 228 of the relevant entry. When an incoming request 312 is written into the pending request buffer 204, the free list head pointer 213 is updated utilizing the value in the next request pointer 1 field 226 stored in the SRAM 235.

If the new request queue 154 is empty, the new request queue head pointer 212 equals the free list head pointer 213. Furthermore, if there are no pending requests, the current request pointer 240 is set to the new request queue head pointer 212.

The current request pointer 240 indexes into the third SRAM 234 containing the next request pointer to yield the pointer to the next request in the queue (i.e., an OP-VL, an IP and new request queue) from which the current request comes, given more than one request in the relevant queue. During the resource allocation, if the current request moves from one queue to another, the next request becomes the head of the queue from which the current request came.

At 254, two multiplexer inputs for the current request pointer 240 are from the heads of the OP-VL and IP request queues 170 and 172.

The multiplexer indicated at 256 selects between the incoming "just-arrived" request 312 and a pending request from an OP-VL request queue 170 or an IP request queue 172, as presented by the selector logics 162 and 164, according to the priority selector logic 156 or the new request queue.

Management Tables

Figure 11:
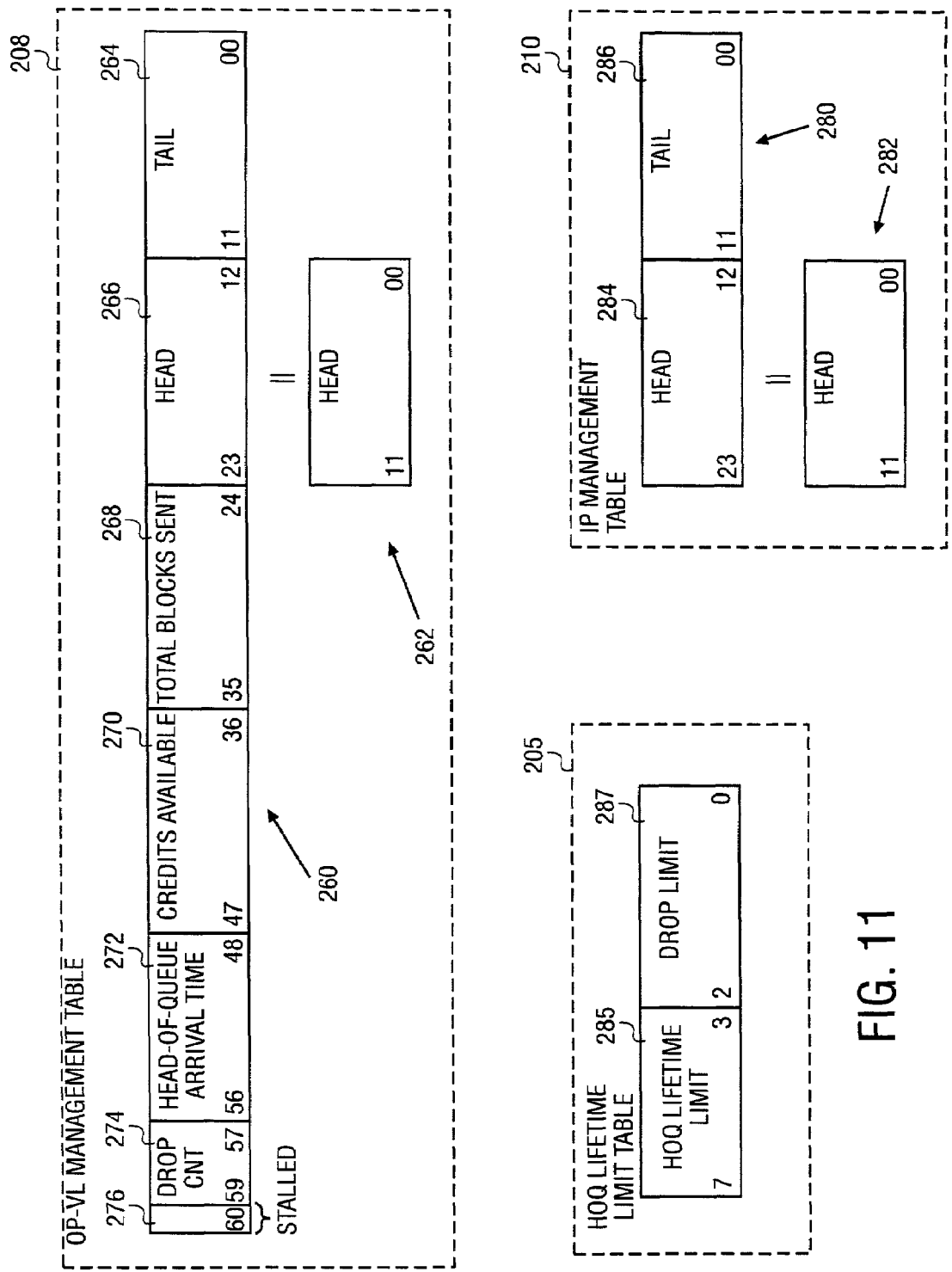
FIG. 11 provides diagrammatic representation of the content of entries within an OP-VL management table and an IP management table, according to an exemplary embodiment of the present invention.

FIG. 11 shows diagrammatic representations of the content of entries within the OP-VL management table 208, the IP management table 210 and the HOQ lifetime limit table 205, according to an exemplary embodiment of the present invention.

The OP-VL management table 208, as discussed above, includes an entry for each OP-VL request queue 170, and each entry includes information pertaining to a respective queue 170. In one embodiment, the OP-VL management table 208 includes 288 entries for a datapath 20 that has eighteen ports and supports sixteen virtual lanes.

As shown in FIG. 11, the management table 208 includes two banks, namely a primary bank 260 that constitutes a main copy of all fields, and a head bank 262 that is a duplicate copy of the head-of-queue pointer that is utilized to initiate processing of the request at the head of the queue. The fields within the primary bank 260 include, for an associated queue 170, a tail pointer 264, a head pointer 266, a total blocks sent indicator 268 that records the total number of blocks sent to the OP-VL combination, a credits available indicator 270, a head-of-queue arrival time 272, a drop count 274 and stored flag 276.

The IP management table 210 again consists of a primary bank 280 that stores main copies of fields, and a head bank 282 that stores a duplicate copy of a head-of-queue pointer that is used to initiate processing of the request at the head of the queue. Each entry within the primary bank 280 constitutes a head pointer 284 and a tail pointer 286 for the respective IP request queue 172.

The HOQ lifetime limit table 205 includes a HOQ lifetime limit 285 and a drop limit 287 for each port of the relevant switch.

Arbiter Pipeline

Figure 12A:
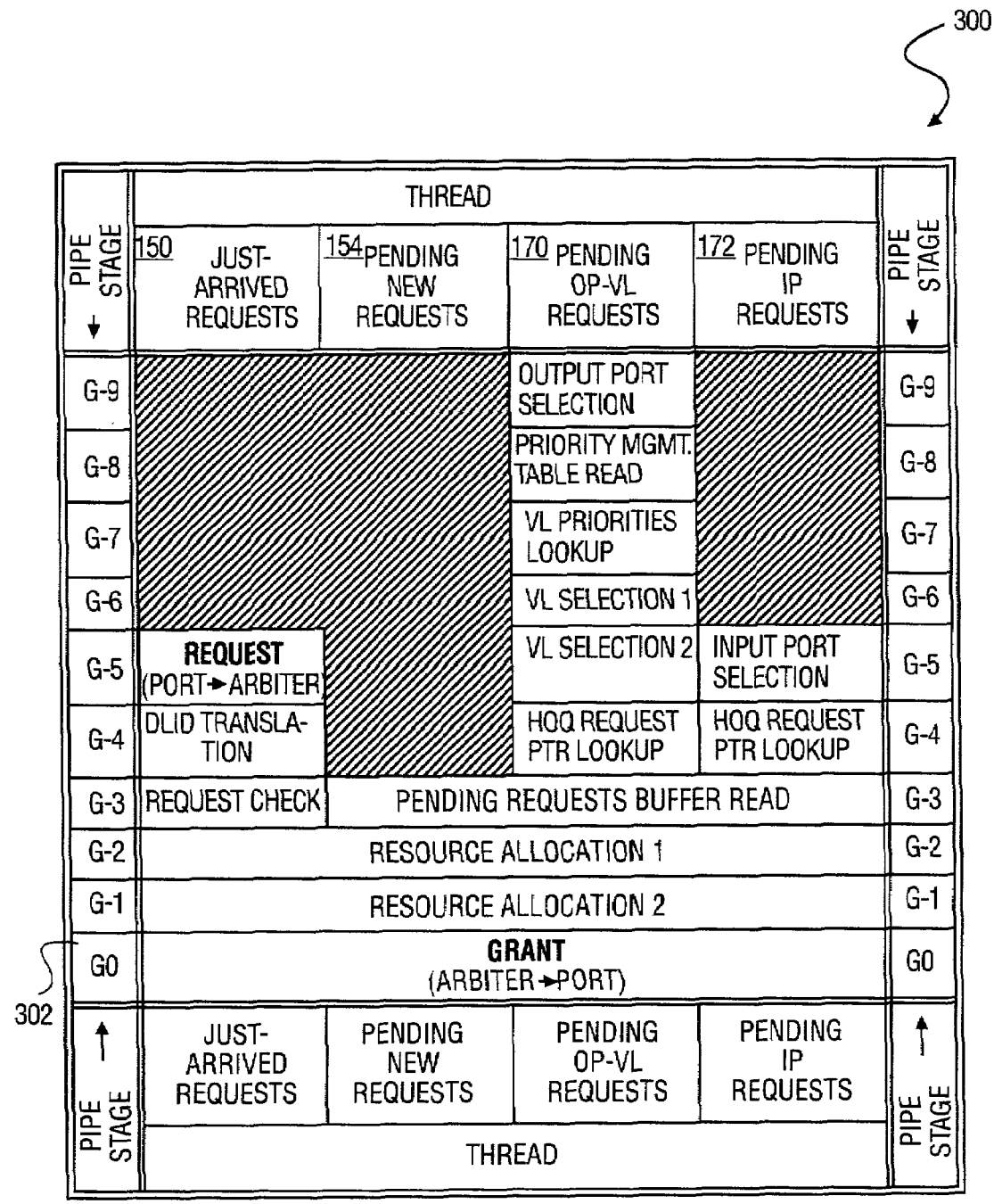
FIG. 12A is a tabular representation of an arbiter pipeline implemented within an arbiter, according to an exemplary embodiment of the present invention.

FIG. 12A is tabular representation of an arbiter pipeline 300 implemented within the arbiter 36, according to one embodiment of the present invention. The pipeline stages illustrated in FIG. 12A are referenced back from a grant stage 302, which is labeled as G0. At a high level, the pipestages relevant to the arbiter are:

(1) G-5: The request pipestage. A request command is multiplexed through the crossbar path from the requester to the arbiter 36.

(2) G-4: Destination Local Identifier (DLID) translation pipestage: The destination address, or Destination Local Identifier (DLID) is used to lookup the port number, VL mapping and partitioning is commenced.

(3) G-3: Request Checking Pipestage: VL mapping is complete and various checks are performed on the request.

(4) G-2: Resource Allocation Pipestage 1: The arbiter 36 looks up various resource data within the memory 202.

(5) G-1: Resource Allocation Pipestage 2: The arbiter 36 checks for request contention and resource availability.

(6) G-0: Grant Pipestage. A grant command is broadcast through the crossbar to all ports.

Figure 12B:
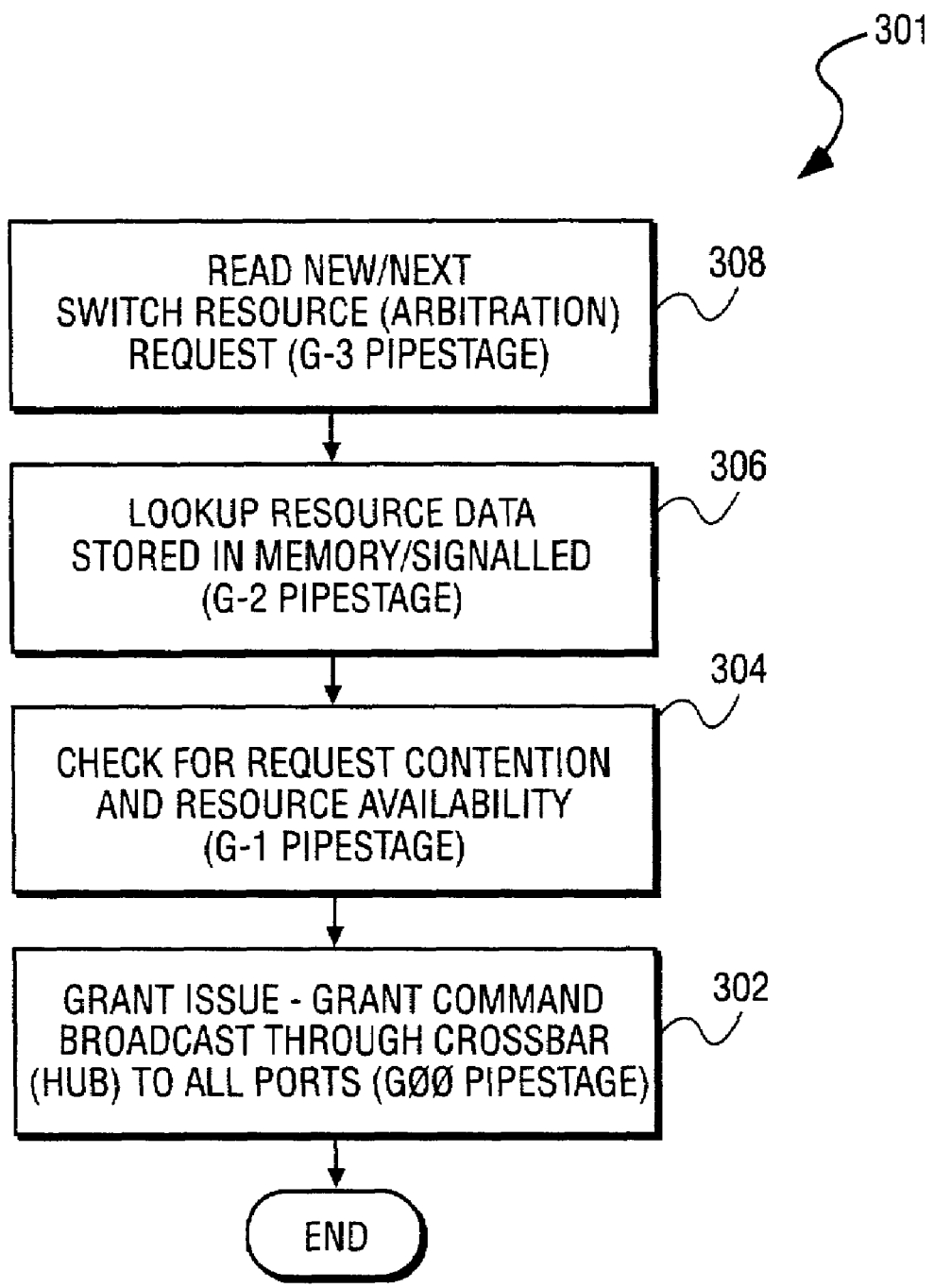
FIG. 12B is a flow chart illustrating operations performed within an arbiter within each of the pipestages illustrated in FIG. 12A, according to an exemplary embodiment of the present invention.
Figure 13A:
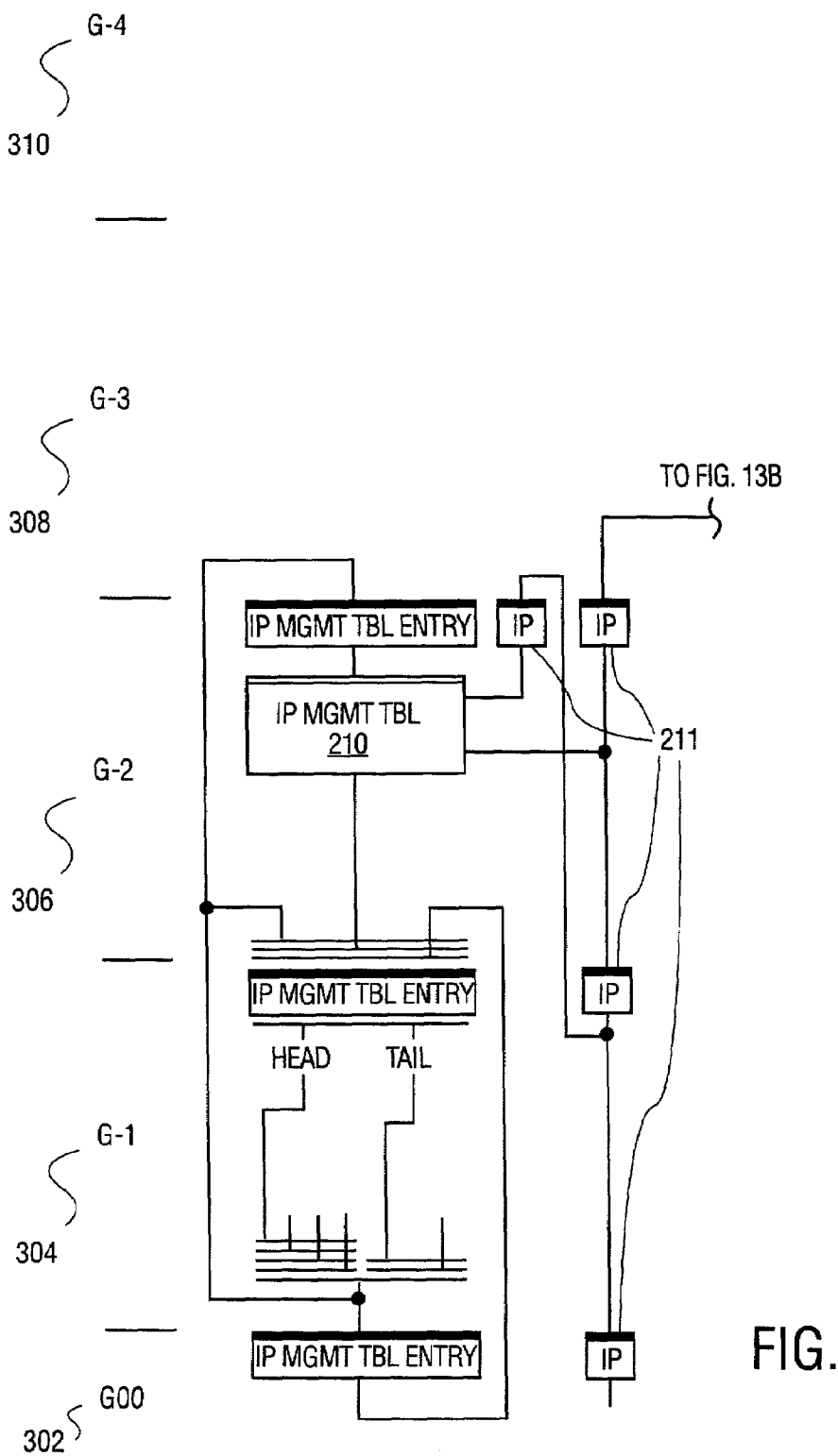
FIGS. 13A–13D provide a pipestage representation of the function of components of a resource allocator, according to an exemplary embodiment of the present invention.
Figure 13B:
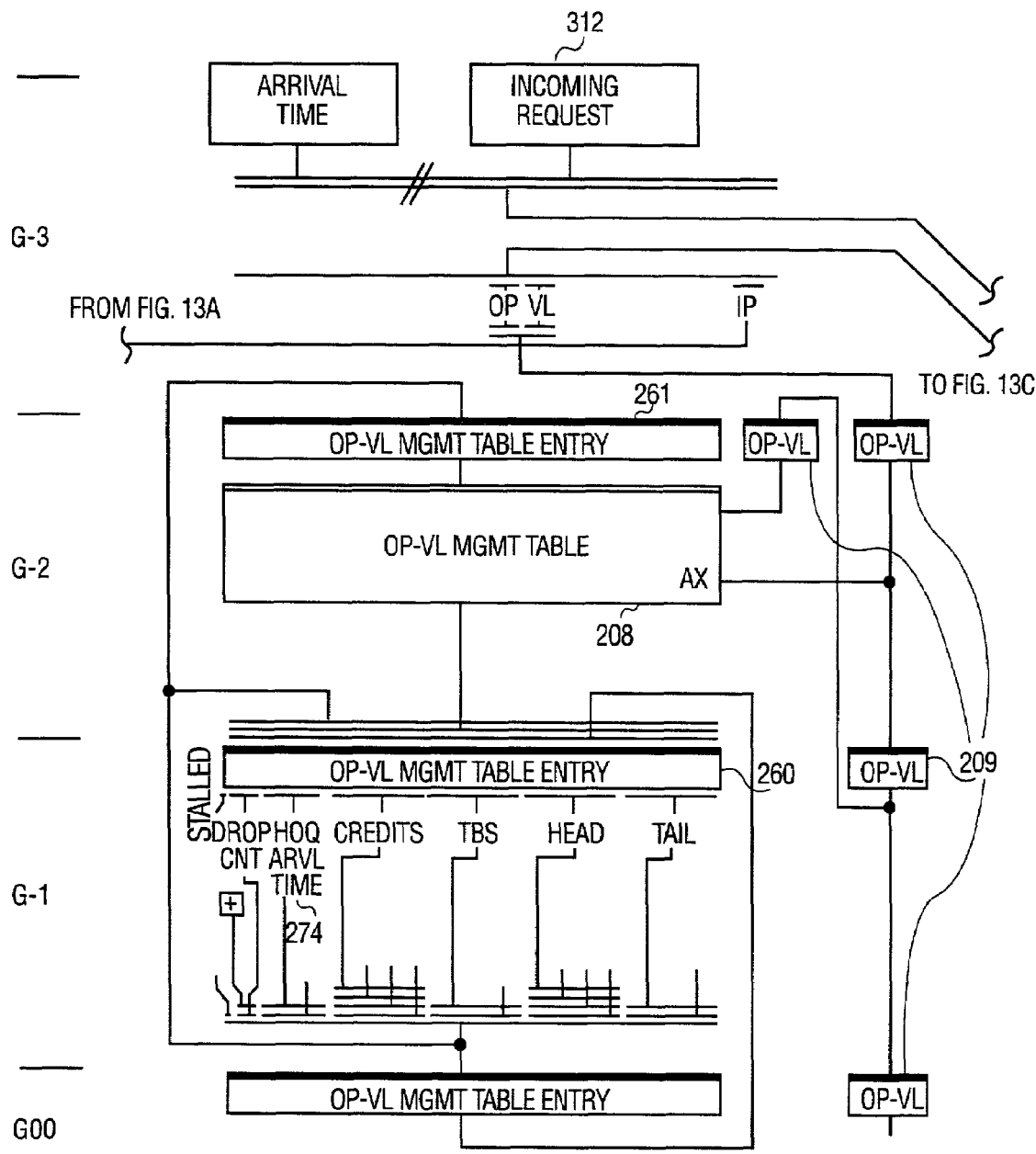
Figure 13C:
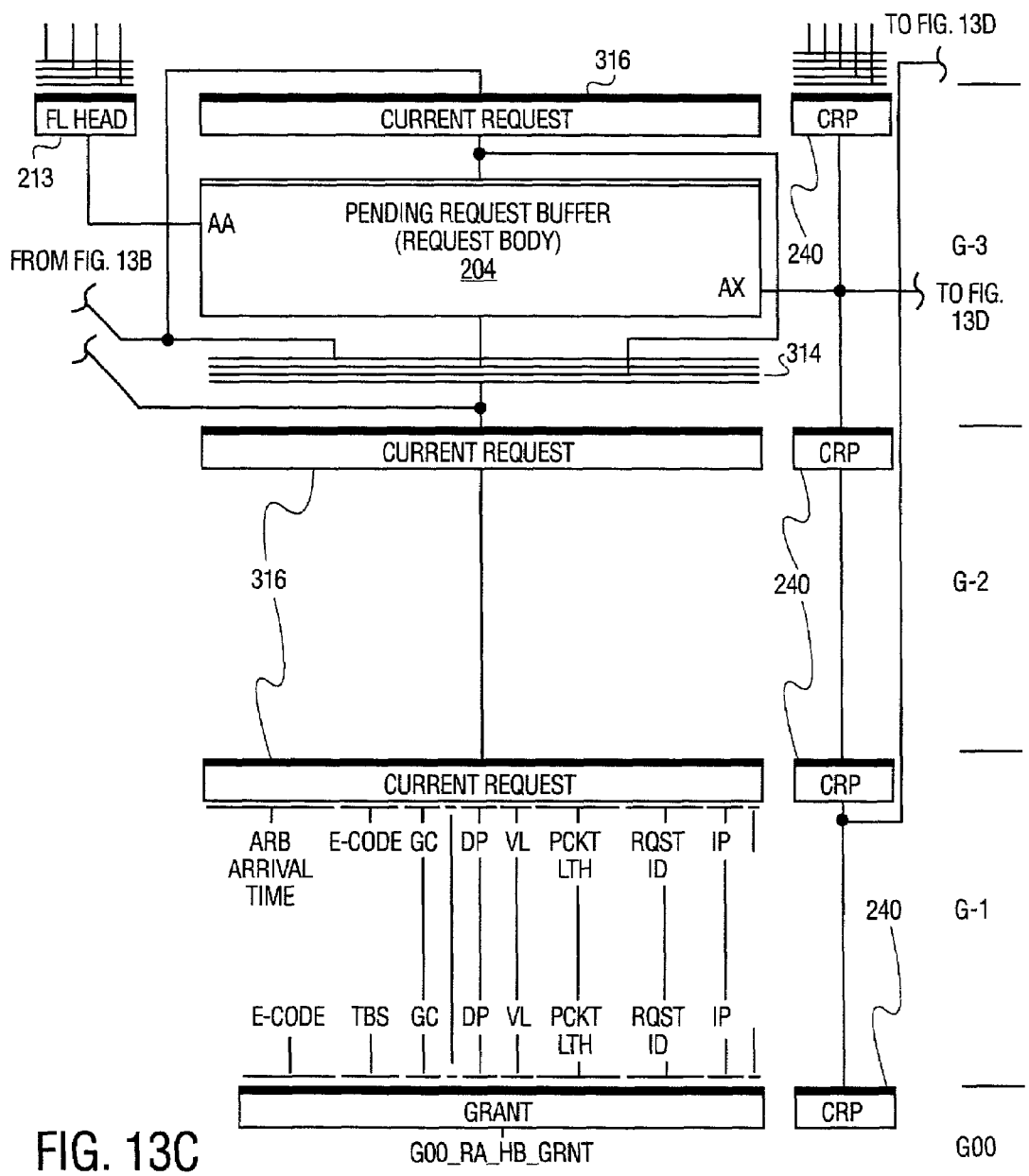
Figure 13D:
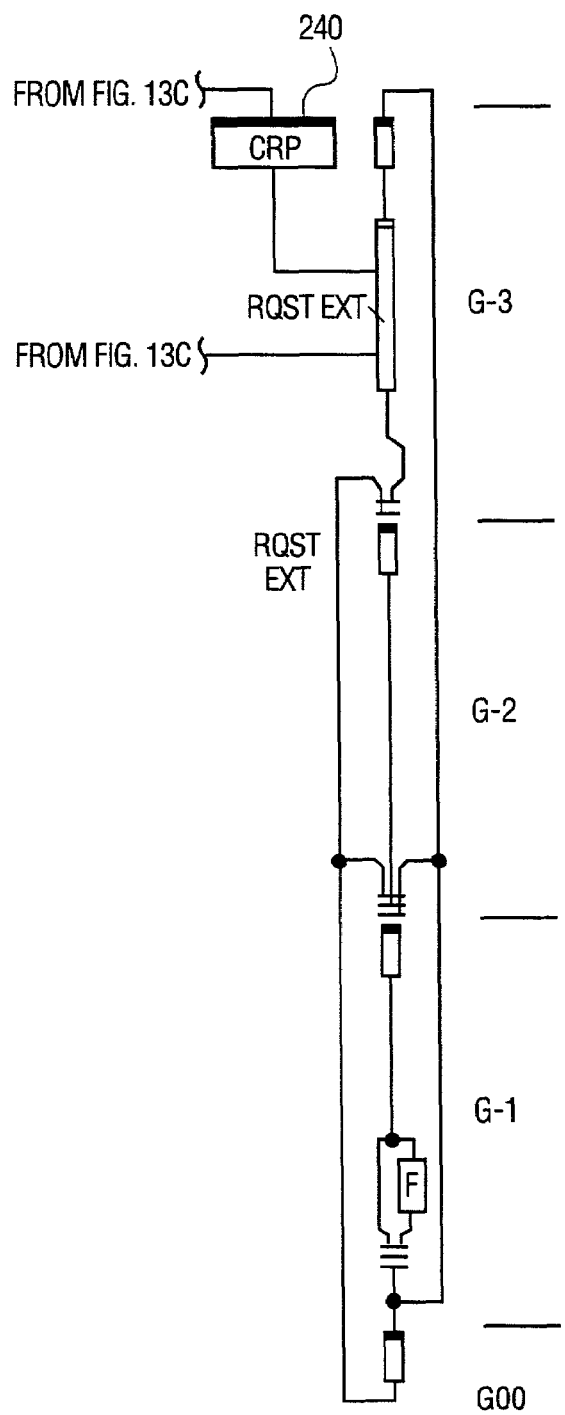

FIG. 12B is a flowchart illustrating the operations 301 performed within the arbiter 36 at each of the above-mentioned pipestages.

FIG. 12A also indicates that the arbiter 36 has four "request threads" corresponding to the sources that feed into the priority selector logic 156, as illustrated in FIG. 5. These request threads include the incoming "just arrived" requests 312, new requests contained within the new request queue 154, OP-VL requests contained within the OP-VL request queues 170, and pending IP requests contained within the IP request queues 172.

It will be noted from FIG. 12A that three pending requests (threads) merge at pipestage G-3 and that pending requests merge with incoming requests 312 at pipestage G-2.

Pipestages G-4 through G-0 are pertinent to an understanding of the operation of the resource allocator 40. To this end, FIGS. 13A–13D provide a pipestage representation of the functioning of components of the resource allocator 40, according to one embodiment of the present invention.

The modified request is produced during the first part of the G-3 pipe stage in the request preprocessor 38.

As will be described in further detail below, during the G-4 pipestage, the OP-VL request selector logic 162 and the IP request selector logic 164 perform lookups on the head of two pointers and, based on the arbitration scheme employed by each of the selector logics 162 and 164, each of the logics 162 and 164 presents a head-of-queue pointer to the priority selector logic 156. The priority selector logic 156 then selects among candidate requests presented from the new request queue 154, the OP-VL request selector logic 162, the IP request selector logic 164 and an incoming request 312. The head-of-queue pointer selected by the priority selector logic 156 is then designated as the current request pointer (CRP) 240 in the G-4 pipestage. Accordingly, at the G-3 pipestage, if there are no pending requests, an incoming request 312 becomes the current request 316.

Figure 14:
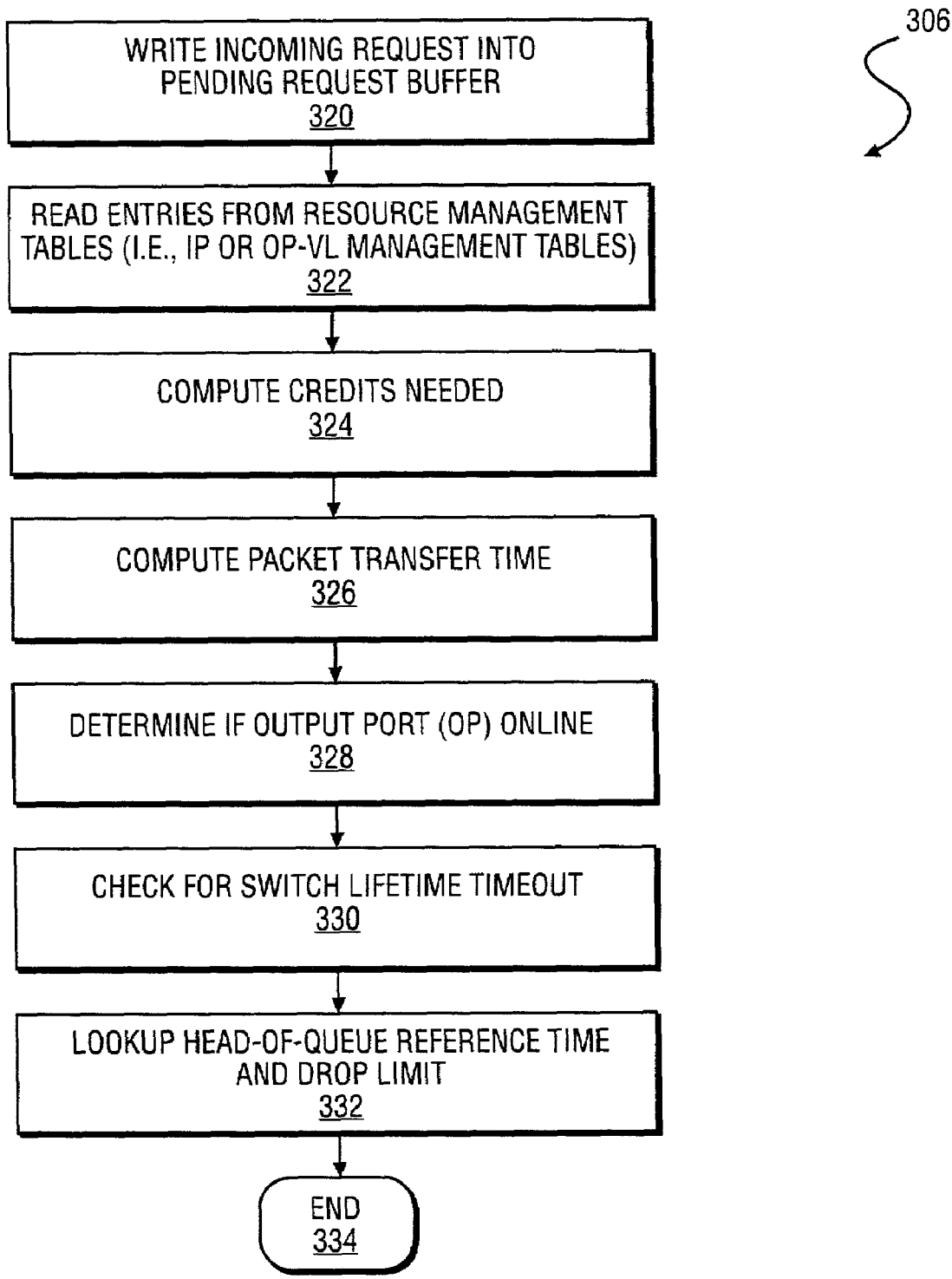
FIG. 14 is a flow chart illustrating a method, according to an exemplary embodiment of the present invention, of performing lookup operations on resource data stored within a memory.

FIG. 14 is a flow chart illustrating a method 306, according to an exemplary embodiment of the present invention, of performing lookup operations on resource data stored within the memory 202.

At block 320, an incoming request 312, as illustrated in FIG. 12A, is written into the pending request buffer 204.

At block 322, entries for a current request 316, as identified by the current request pointer 240, are read from the resource management tables (e.g., the OP-VL management table 208 or the IP management table 210). Specifically, the output port and virtual lane identifiers 132 and 134 of a current request 316 are utilized to look up head and tail pointers for the corresponding OP-VL request queue within the OP-VL management table 208. Similarly, the input port identifier 140 may be utilized to look up head and tail pointers for a corresponding IP request queue 172 within the IP management table 210.

At block 324, the number of flow-credits needed by the request is calculated. This calculation is performed utilizing the packet length value 144 of the current request. This computation is expressed below:

Credits Needed (G-2) – credits_needed = $pckt\text{-}1th \; div \; 16) + 1$;

At block 326, a packet transfer time required to transfer the packet associated with the request through the crossbar 22 is calculated. This calculation is performed utilizing a transfer rate value 146, indicated in the current request that is divided by a crossbar width and multiplied by the packet length value 144. An exemplary calculation to calculate the transfer rate value 146 is provided below:

Transfer Time=(4*Transfer Range/Xbar Width)* (Packet Length+1);

The below table shows packet length multiplier values for various transfer rates/crossbar width combinations:

TABLE 1

| Crossbar Width | Packet Length Multiplier | | | |
|---|---|---|---|---|
| | Transfer Rate (cycle/word) | | | |
| (Bytes) | 1 | 4 | 3 | 12 |
| 1 | 4 | — | — | — |
| 4 | 1 | 4 | — | — |
| 12 | ⅓ | — | 1 | 4 |

At block 328, a determination is made as to whether the output port identified by the output port identifier 132 of the request, is currently online. This determination is made using information is stored in a small table called the "credit status table" 207, illustrated in FIG. 8

At block 330, this check is performed to determine whether the difference between a reference time value (generated by a local timer) and the arrival time 228 is greater than a switch lifetime limit 215, which is a programmable value.

At block 332, a head-on-queue reference time and drop limit are looked up.

Each output port has a programmable HOQ lifetime limit 285 and a drop limit 287. The HOQ lifetime limit 285 is the maximum time a packet may be at the head of an OP-VL request queue 170. If exceeded (timeout) the packet is dropped and the drop count 274 is incremented. If the drop count 274 meets or exceeds the drop limit 287, the OP-VL request queue 170 enters a "stalled state", indicated by the stalled bit 276, for a duration of 8 times the HOQ lifetime limit 285. While in the stalled state, all other queued requests for the OP-VL request queue 170 are dropped. This is a congestion control feature defined by the Infiniband Specification. The method 306 then ends at block 334.

Figure 15:
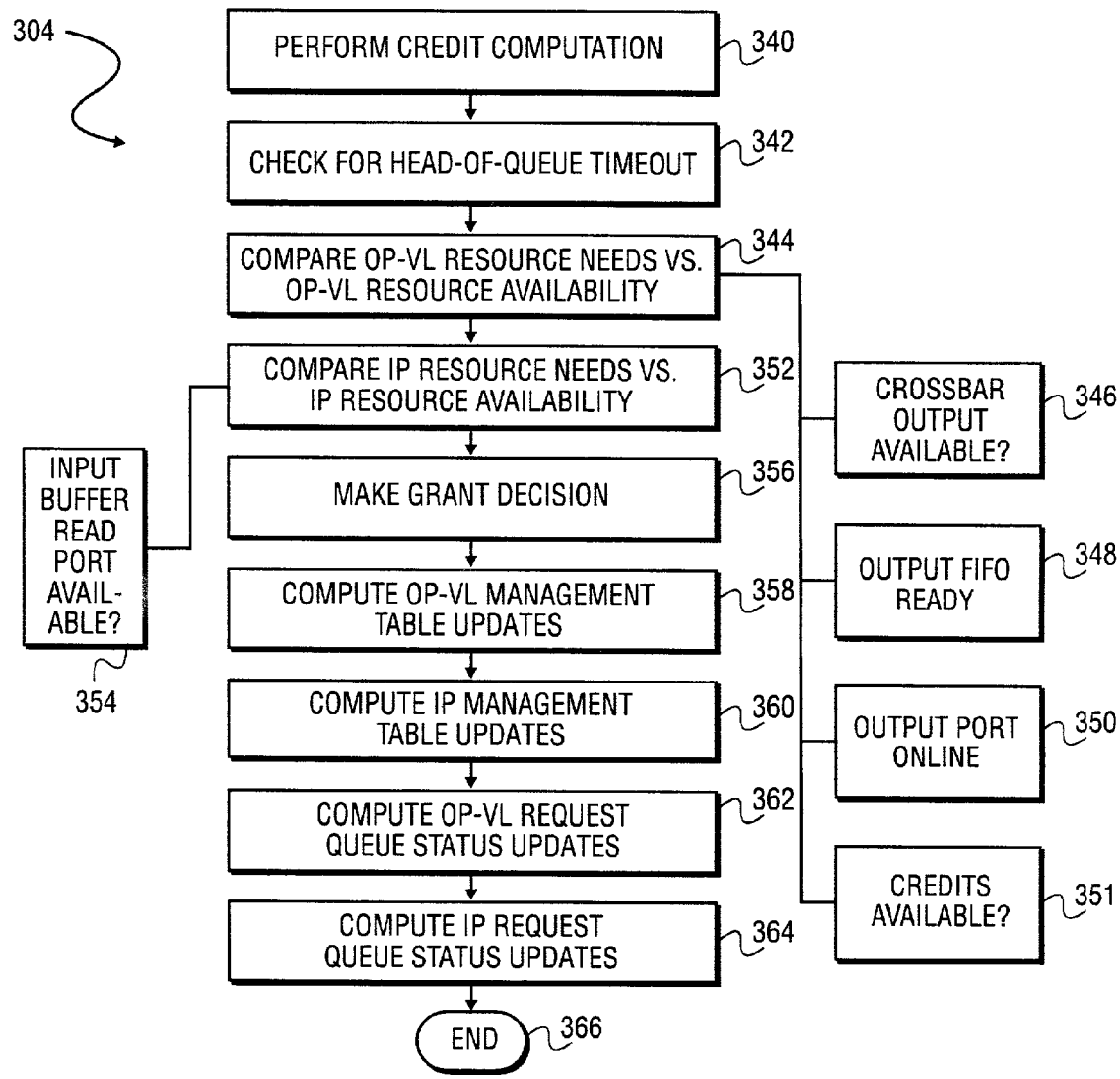
FIG. 15 is a flowchart illustrating a method, according to an exemplary embodiment of the present invention, of performing a number of operations to check for request contention and resource availability at a pipestage at an arbiter.

FIG. 15 is a flow chart illustrating a method 304, according to an exemplary embodiment of the present invention, of performing a number of operations to check for request contention and resource availability at the G-1 pipestage of the arbiter 36.

At block 340, a credit computation is performed. The below Table 2 provides examples of such credit computations within the exemplary context of the datapath 20 illustrated in FIG. 2.

TABLE 2

| Acquisition (G-1) | |
|---|---|
| credits_avail = | fccl – total_blocks_sent; |
| total_blocks_sent = | total_blocks_sent; |
| Allocation (G-1) | |
| credits_avail = | credits_avail – credts_needed; |
| total_blks_sent = | total_blks_sent + credts_needed; |
| Recovery (G-1) | |
| credits_avail = | credits_avail + credts_needed; |
| total_blks_sent = | total_blks_sent – credts_needed; |

At block 342, a check is performed for a head-of-queue timeout by determining whether a head-of-queue reference time (hoq_ref_time), determined at block 332 of FIG. 14, less a head-of-queue arrival time 272 (hoq_arvl_time) retrieved from the OP-VL management table 208 is greater than a predetermined limit Head-of-queue (HOQ) lifetime limit (HLL) 285. This determination is made so as to prevent a request, which has become "stuck" at the head of a queue from unreasonably blocking processing of further requests behind it in the relevant queue for which resources may become available. Accordingly, if a head-of-queue timeout is detected at block 342, the relevant request is timed out.

At block 344, a comparison of OP-VL resource needs, to satisfy the current request 316, against OP-VL resource availability is performed. Specifically, at block 346, a determination is made as to whether a crossbar output port, required by the relevant request, is available. In one embodiment, this may involve detecting whether the relevant output port is in one of three states, namely:

(1) A busy state: This is indicated by a port tracker (not shown) that indicates to the arbiter whether an output port is busy with a transmission. The port tracker is a sub-unit within the arbiter 36 that counts the time input ports and output ports spend transferring packets across the datapath 20. External ports have three crossbar feeds and can source up to three packets simultaneously. The BIST and management ports 28 and 26 each have one crossbar feed. All ports have one crossbar output and can sink one packet at a time. The port tracker has one counter for each crossbar input and each crossbar output that is used to count the time each crossbar connection is in use after a grant. Transfer time is a function of packet length and transfer rate. For example, the transfer rate can be either one four-byte word every clock cycle (full speed) or one four-byte word every fourth clock cycle (quarter speed).

(2) A reserved state: An output port may be reserved for a specific request within an IP request queue 172; and (3) A just granted state: The port tracker discussed above requires two cycles to register a busy condition following a grant. The resource allocator 40 keeps a local record of all grants made during the two previous clock cycles.

At block 348, a determination is made as to whether the output FIFO 66 of an output port 24 is ready. To this end, each port provides a signal to the arbiter 36 indicating whether its output FIFO 66 is ready to receive data for transmission.

At block 350, a determination is made as to whether the relevant output port 24 is online. More specifically, ports 24 report their online/offline status in the port status identifier 98 of a credit update request 74. This information is stored in a small table called the "credit status table" 207. This table 207 is read during a G-2 pipestage using the current request's output port field as an index.

At block 351, a determination is made as to whether sufficient flow output control credits are available to accommodate the request. Specifically, the credits needed by the current request 316, as computed at block 324 in FIG. 14, are compared against the credits available indicator 270, as indicated within the entry 260 for the relevant queue within the OP-VL management table 208. As described above, the credits available indicator 270 is an indication, provided by a flow control mechanism, regarding whether a destination port on a downstream device for the relevant packet has sufficient capacity to absorb the packet.

Assuming positive determinations for each of the resource availability checks performed at blocks 346, 348, 350 and 351, an output port-virtual lane (OP-VL) resource is allocated and reserved for the relevant request. On the other hand, should any OP-VL resource be unavailable, the request is returned to the back of an appropriate OP-VL request queue 170 if the request is an incoming request. Alternatively, if the request is at the head of an OP-VL request queue 170, the request is maintained at the head of that queue 170.

At block 352, a comparison is performed between the input port (IP) resource needs of the request, and input port (IP) resource availability. In one embodiment, this requires a determination at block 354 as to whether a read port-crossbar input 59, as illustrated in FIG. 3, of an input buffer 58 of the relevant input port 24 is available. As illustrated in FIG. 3, in one embodiment, each input buffer 58 is provided with three read port-crossbar inputs 59. This may involve determining whether the relevant read port-crossbar input 59 is in one of two states, namely:

(1) A busy state: This is again monitored by the port tracker (not shown); and (2) A just granted state: This state is entered for two cycles after a grant (i.e., G0 and G+1) and before a port tracker indicates a busy state.

A negative determination at block 354 will result in the relevant request being resubmitted to the back of the relevant IP request queue 172.

At block 356, a grant decision is made, based on the comparisons of blocks 344 and 352. Specifically, if both the OP-VL resources and IP resources required by the current request 316 are available, then a decision is made to issue a grant. On the other hand, if either the OP-VL resources or the IP resources are unavailable, the request will be placed to the back of a relevant request queue if the request is newly added to the relevant queue. On the other hand, if the request is already at the head of a queue, then the request is simply maintained at the head of that queue if resources are unavailable. It should also be noted that, if an OP-VL resource is available, this is allocated to the relevant request, regardless of whether an IP resource is available or not. Such a request may then be placed on a relevant IP request queue 172, or may be granted depending on whether an IP resource is available or not. On the other hand, should an OP-VL request be unavailable, the request is maintained through the relevant OP-VL request queue 170, without an IP resource being allocated to that request.

To summarize, in the case where a particular resource required by a request is unavailable, the request is maintained within an appropriate queue. The manner in which the request is maintained within the appropriate queue is dependent on whether the request is being newly added to the relevant queue, or is already at the head of a queue. Where a request is to be newly-added to a queue, and the relevant queue is empty, the newly-added request falls through to the head of the appropriate queue. In the scenario where a newly-added request is added to a queue that already contains one or more requests, the newly-added request is added to the tail of the queue. In a third scenario where the request for which resources are unavailable is already at the head of the queue, the relevant request is maintained at the head at the queue in the absence of needed resources.

Returning to FIG. 15, at block 358, updates to the OP-VL management table 208 are computed. Referring specifically to FIG. 11, the stalled flag 276, drop count 274 and head-of-queue arrival times 272 for the relevant OP-VL request queue 170 are updated. Further, the credits available indicator 270 and total blocks sent indicator 268 are updated, dependent upon the outcome of the grant decision. Finally, the head and tail pointers 266 and 264 are updated. For example, if the relevant OP-VL request is returned to the back of the queue 170, or the request is removed from the queue 170, the head and tail pointers 266 and 264 will require updating.

At block 360, updates to the IP management table 210 are computed. Specifically, the head and tail pointers 284 and 286 are updated, dependent upon the grant decision. For example, if the relevant request is granted, the head and tail pointers 284 and 286 are updated to indicate that the entry within the pending request buffer 204 occupied by the request is transferred to the free list 206. On the other hand, should the relevant record be recycled through the IP request 217, the head and tail pointers 284 and 286 will be updated to reflect the requests new location at the tail of the queue 172.

At block 362, updates to the OP-VL request queue status are computed, and at block 364, updates to the IP request status are computed. The updates, in one embodiment, include setting status updates associated with each of the OP-VL and IP queues 170 and 172 maintained within status tables maintained within memory 202. FIG. 8 provides examples of these status tables which include an OP-VL request waiting table 191, an OP-VL request pending table 193, an OP-VL request timeout table 195, and an IP request pending table 199.

Each of these tables maintains status bits associated with a queue 170 or 172. Bits within a request waiting table 191 or 197 indicate that one or more requests are awaiting resources within the relevant queue. Status bits within a request pending table 193 indicate that sufficient credits to satisfy the request of an associated queue may exist. Status bits within a request timeout table 195 indicate that the request at the head of the relevant queue has timed out, or that the queue had entered a stalled state and the queue is not empty. The status bits of the OP/VL request waiting table 191 may be utilized for performance monitoring. The status bits within the OP-VL request pending table 193 and the request timeout table 195 are utilized by the OP-VL selector logic 162 to schedule requests for processing. For "pending" requests, the OP-VL selector logic 162 waits until an output port is available, then utilizes, in one embodiment, an InfiniBand priority scheme to schedule the relevant request. Timed out requests are scheduled for disposal as soon as possible. The status bits within the IP request waiting table 197 are utilized by the IP selector logic 164 to schedule requests for processing.

It will be appreciated that in alternative embodiments, the tables discussed immediately above may be consolidated into one or more status tables.

The method 304 then terminates at block 366.

Figure 16:
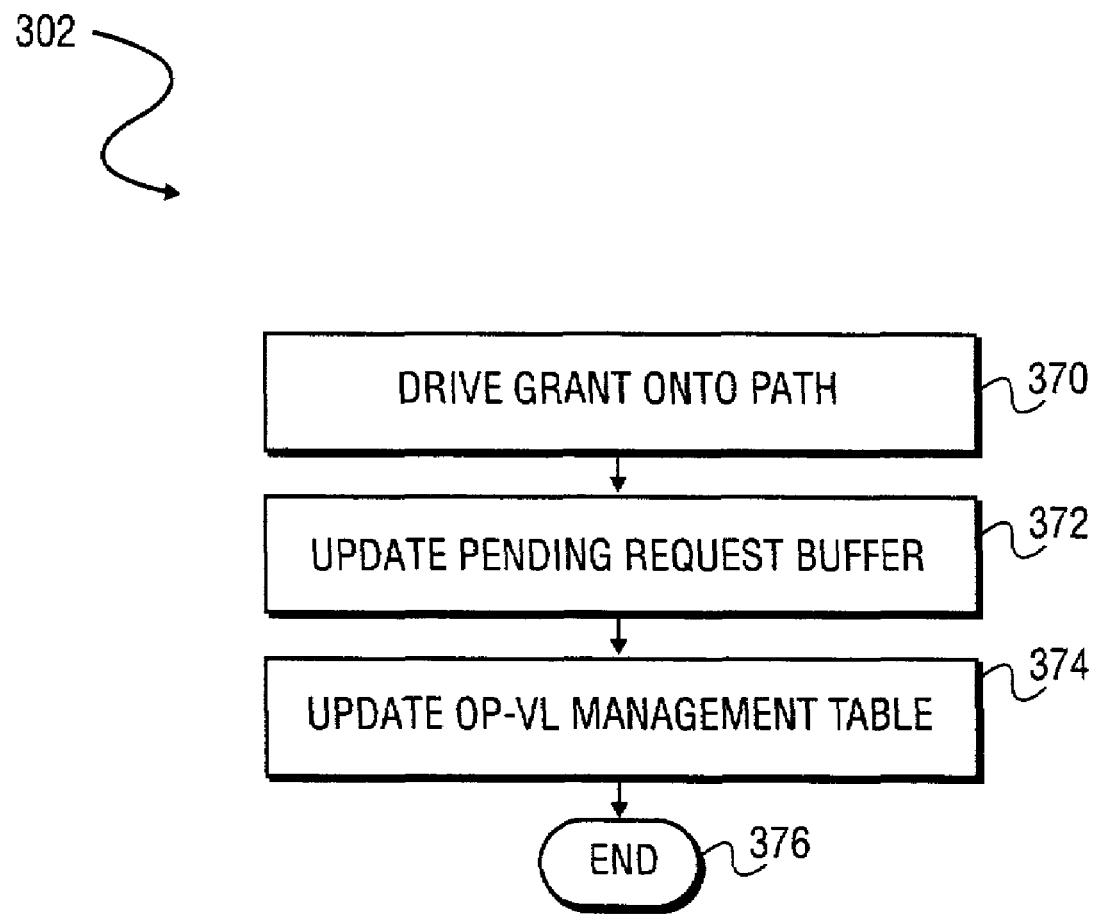
FIG. 16 is a flowchart illustrating a method, according to an exemplary embodiment of the present invention, of performing a grant issue, whereby a grant is broadcast through a data path to all ports of the data path.

FIG. 16 is a flow chart illustrating a method 302, according to an exemplary embodiment of the present invention, of performing a grant issue, whereby a grant is broadcast through the datapath 20 to all ports during the G0 pipestage.

At block 370, the arbiter 36 drives a grant onto the grant bus 34 of the crossbar 22. An exemplary grant 180 is illustrated in FIG. 7.

At block 372, the pending request buffer 204 is updated. Specifically, the request extension field 222 is updated, while the request body is unchanged. The request extension field 222 may be updated to indicate any one of the three errors indicated in FIG. 9 and as detected by the resource allocator 40. The request extension 222 is only needed if there is no available input port-crossbar feed, and the request must be queued in an input port queue 172.

At block 374, the OP-VL management table 208 is updated, as described above, to reflect the grant of a request. Specifically, the credits available indicator 270, the total block sent indicator 268, the head-of-queue arrival time 272, the drop count 274 and the stalled flag 276 are updated in light of the grant.

The method 302 then ends at block 334.

Queue Movement

As described above, a particular request may be cycled through any one of the OP-VL request queues 170, IP request queues 172 or the new request queue 154. Referring to FIG. 8, each entry within the pending request buffer 204 will, at any time, either store a request within one of the above identified queues, or will be allocated to the free list 206 when not storing a pending request.

Figure 17:
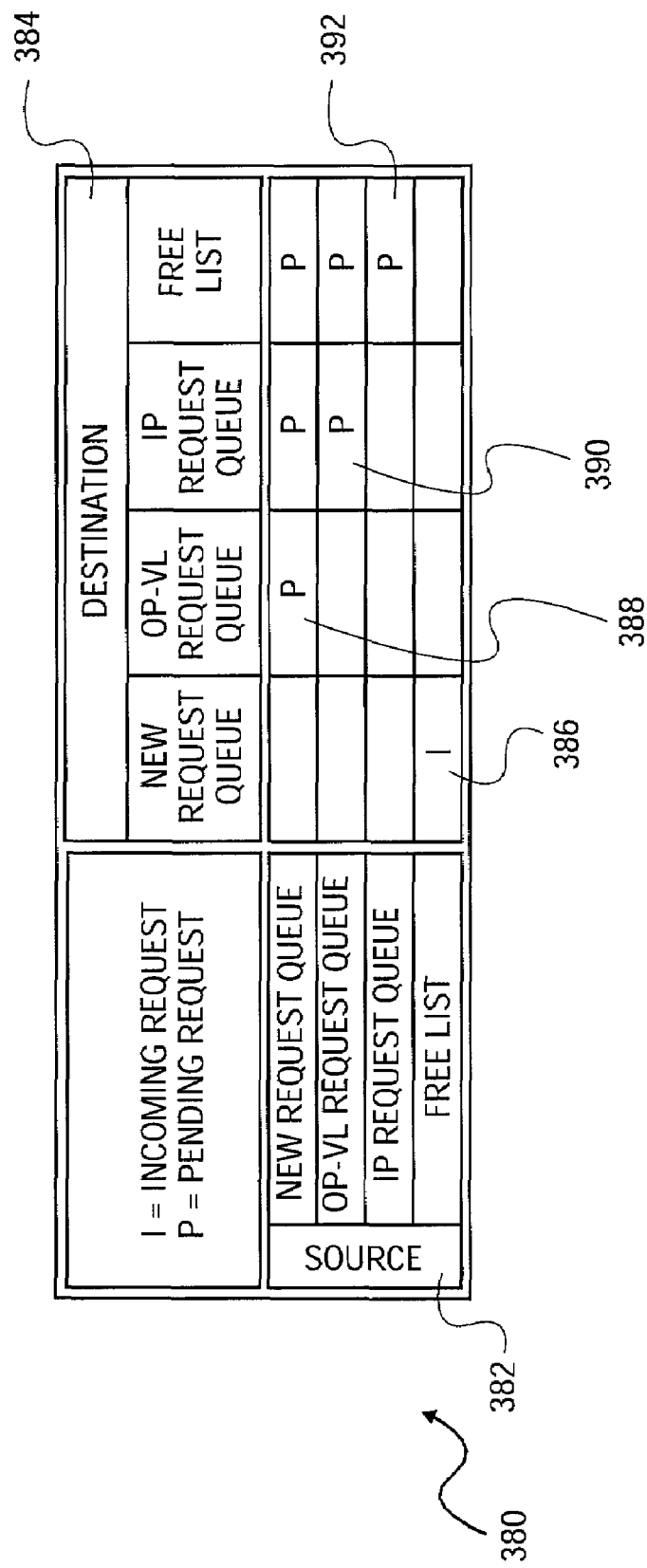
FIG. 17 illustrates an exemplary table that shows permitted queue-to-queue movements for a request within a pending request buffer.

FIG. 17 shows a table 380 that shows permitted queue-to-queue movements for a request within the pending request buffer 204. The letter "I" designates incoming requests 312, whereas the letter "P" indicates a pending request. The table 380 further lists sources 382 and destinations 384 of a request within the pending request buffer 204.

As indicated at 386, an incoming request 312 is always allocated to the new request queue 154, the entry to which the incoming request 312 is written being taken from the free list 206.

As indicated at 388, a pending request within the new request queue 154 may be transferred to: (1) an OP-VL request 170 if an OP-VL resource is unavailable; (2) an IP request queue 172 if an OP-VL resource is available, but an IP resource is unavailable; or (3) out of the queue structure if both OP-VL and IP resources are available and the pending request is granted, with the entry being returned to the free list 206.

As indicated at 390, an entry allocated to an OP-VL request queue 170 may be transferred to: (1) an IP request queue 172, should an OP-VL resource become available, but a required IP resource is unavailable; and (2) out of the queue structure if both the OP-VL and IP resources become available and the pending request is granted, with the entry being returned to the free list 206.

As indicated at 392, an entry within an IP request queue 172 may be transferred only out of the queue structure, and the entry returned to the free list 206, when the relevant IP resource becomes available.

It will be noted that the queue-to-queue movements illustrated in FIG. 17 support concurrent queue operations, in that incoming requests 312 may be placed within the new request queue 154, and a pending request may concurrently move from one queue to another. The pending request buffer 204 also enables the resource allocator 40 to accept one request and issue a grant to another in the same clock cycle.

Figure 18:
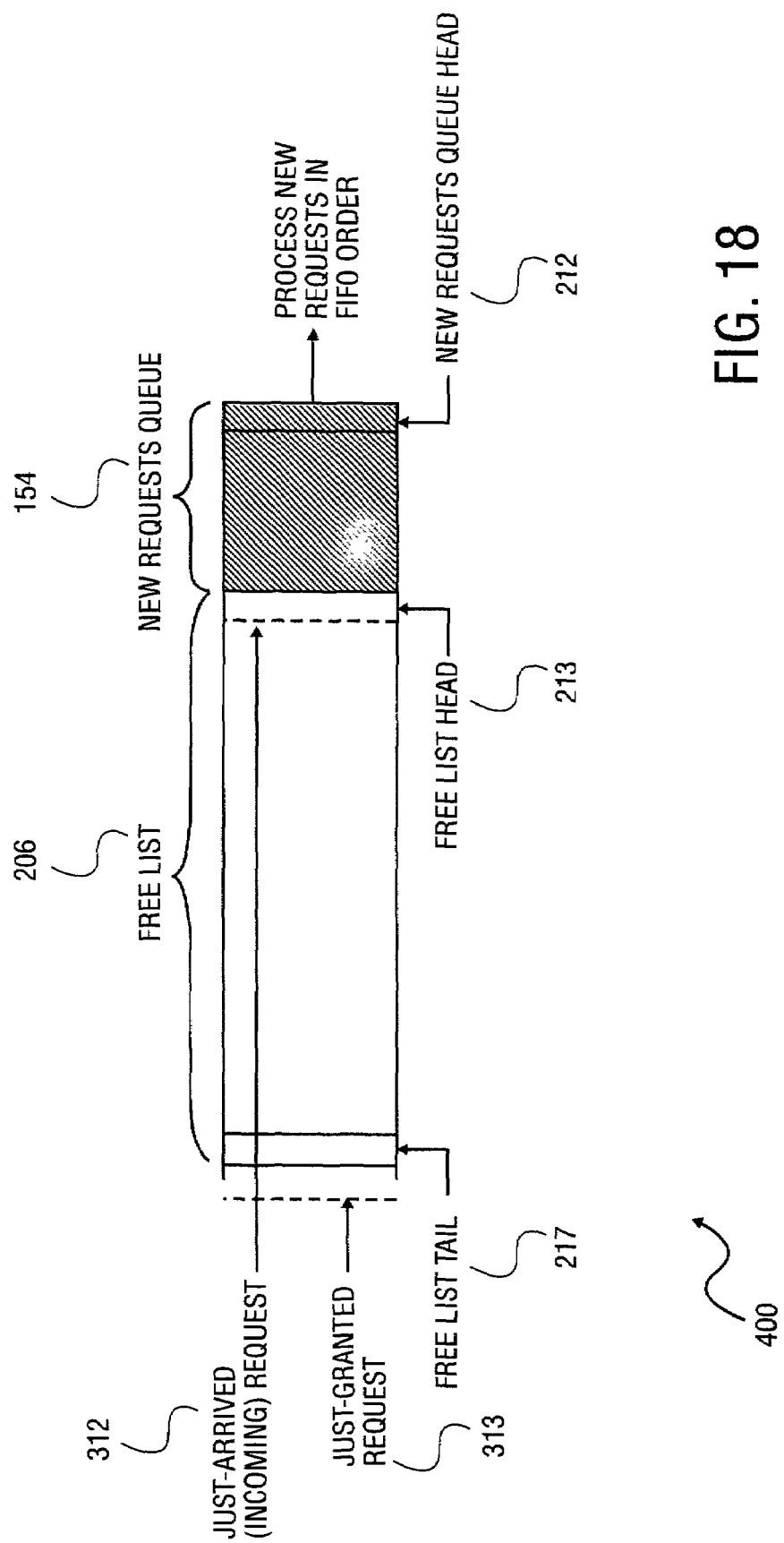
FIG. 18 is a diagrammatic representation of a queue structure, according to an exemplary embodiment of the present invention, wherein a free list and a new request queue are in a concatenated list.

FIG. 18 is a diagrammatic representation of a queue structure 400, according to an exemplary embodiment of the present invention, wherein the free list 206 and the new request queue 154 are in a concatenated list. As noted, no new request queue tail pointer is maintained as the tail of the new request queue 154 is indicated by the free list head pointer 213. Accordingly, for incoming requests 312, the free list head pointer 213 is utilized as the new request queue tail pointer, and the incoming request 312 is written to the entry within the pending request buffer 204 indicated by the free list head pointer 213. The pointer for a just-granted request 313, upon grant of a request, becomes a new free list tail pointer 217.

Accordingly, the new request queue 154 will be regarded empty when the new request queue head pointer equals the free list head pointer 213. Similarly, the free list 206 will be regarded as empty when the free list head pointer 213 equals the free list tail pointer 217.

The queue structure illustrated in FIG. 18 is advantageous in that only three pointers (i.e., the pointers 212, 213 and 217) are required to maintain two linked-list queue structures, namely the free list 206 and the new request queue 154.

Pointer Pipeline and Processing

As illustrated in FIG. 8, a number of pointers to addresses within the pending request buffer 204 are maintained in the memory 202. Specifically, resource request queue pointers (e.g., the OP-VL request queue head and tail pointers and the IP request queue head and tail pointers) are maintained within the management tables 208 and 210.

Request pointers, as opposed to request queue pointers, are shown to include the current request point 240, the next request pointer 242, an old tail pointer 244 and a new tail pointer 246, each of which is discussed above.

The processing of these pointers will now be discussed with reference to FIGS. 19A–19C and FIGS. 20A–20C.

Figure 19A:
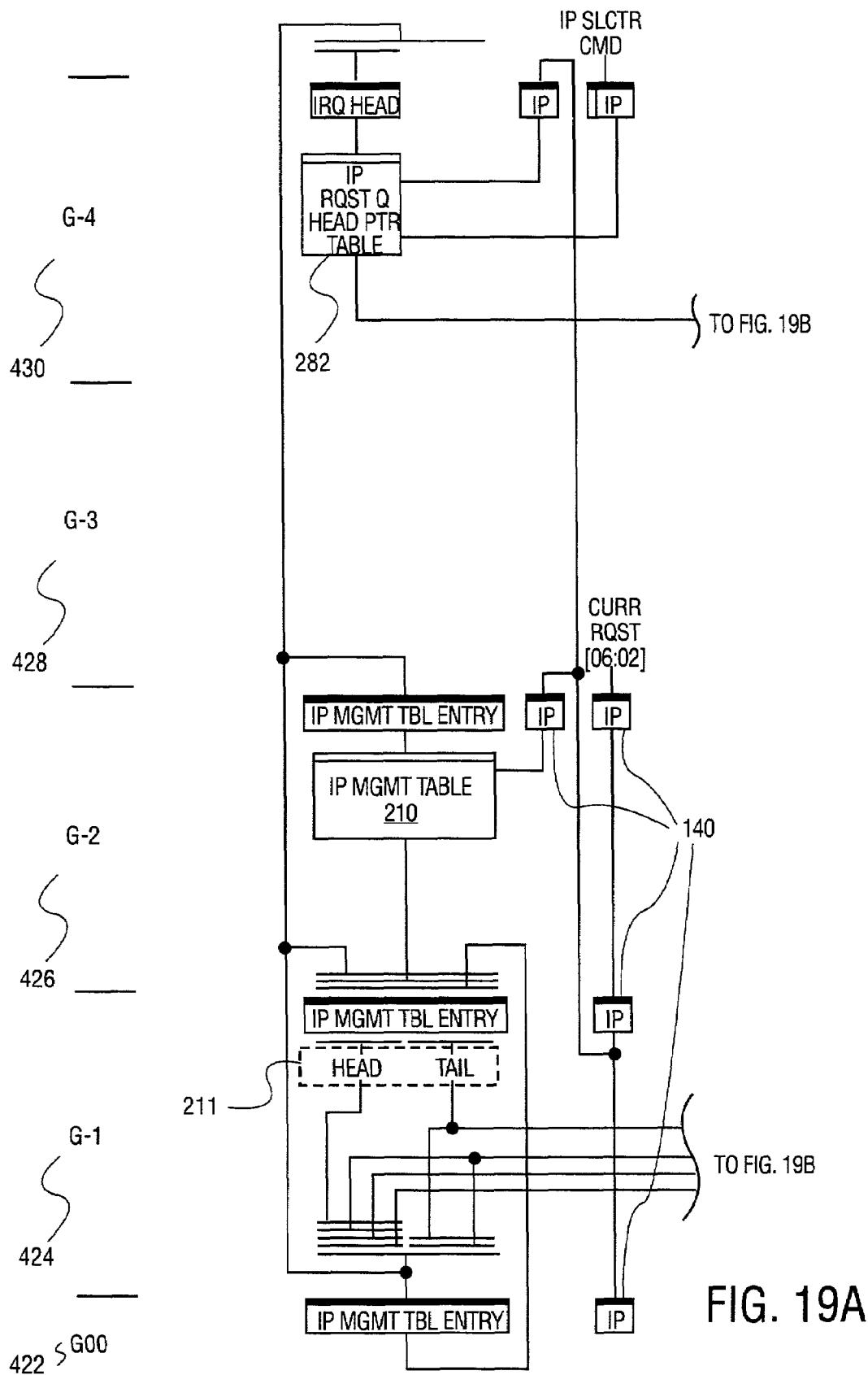
FIGS. 19A–19C provide a diagrammatic representation of a pointer pipeline, according to an exemplary embodiment of the present invention, implemented with a resource allocator.
Figure 19B:
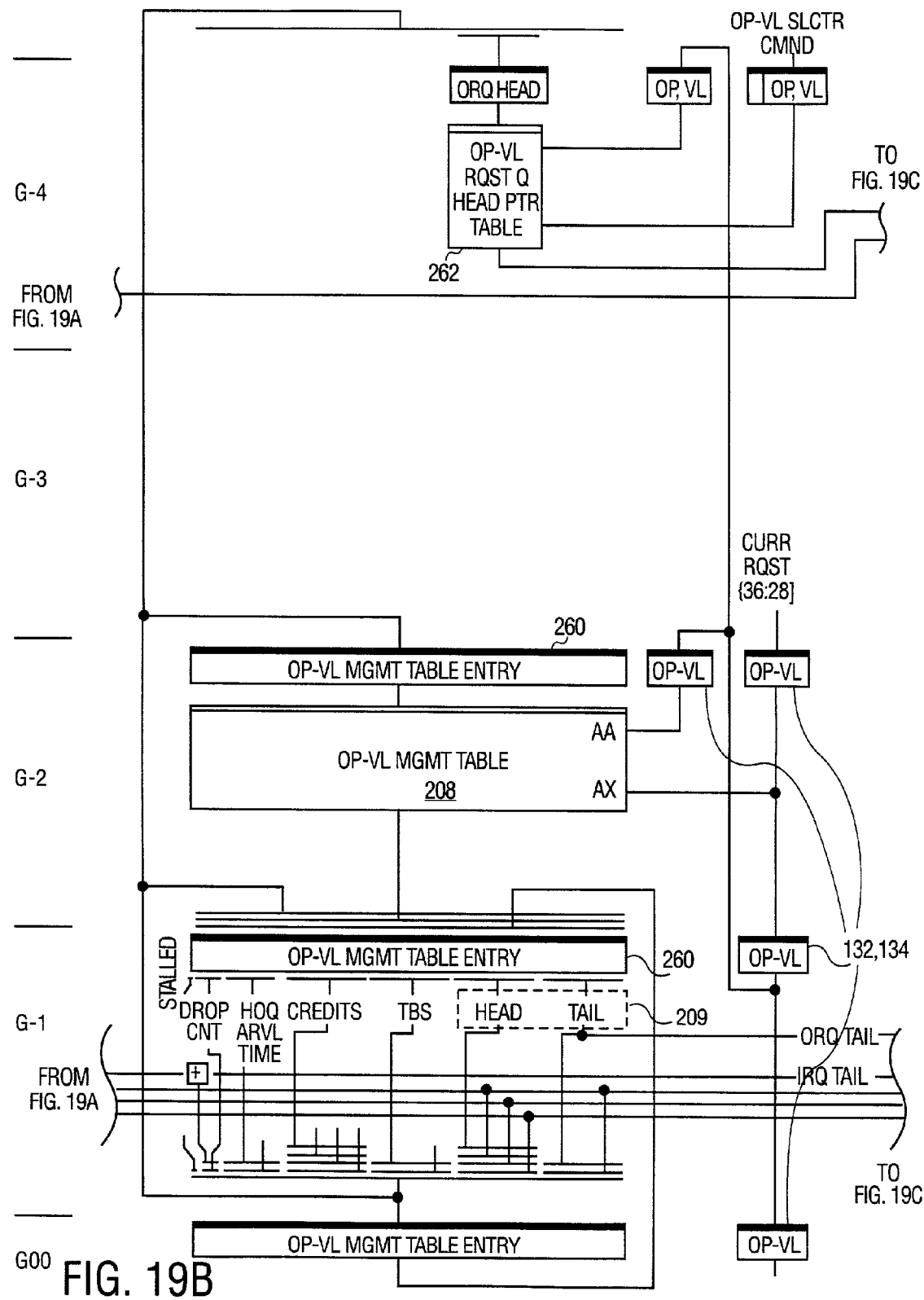
Figure 19C:
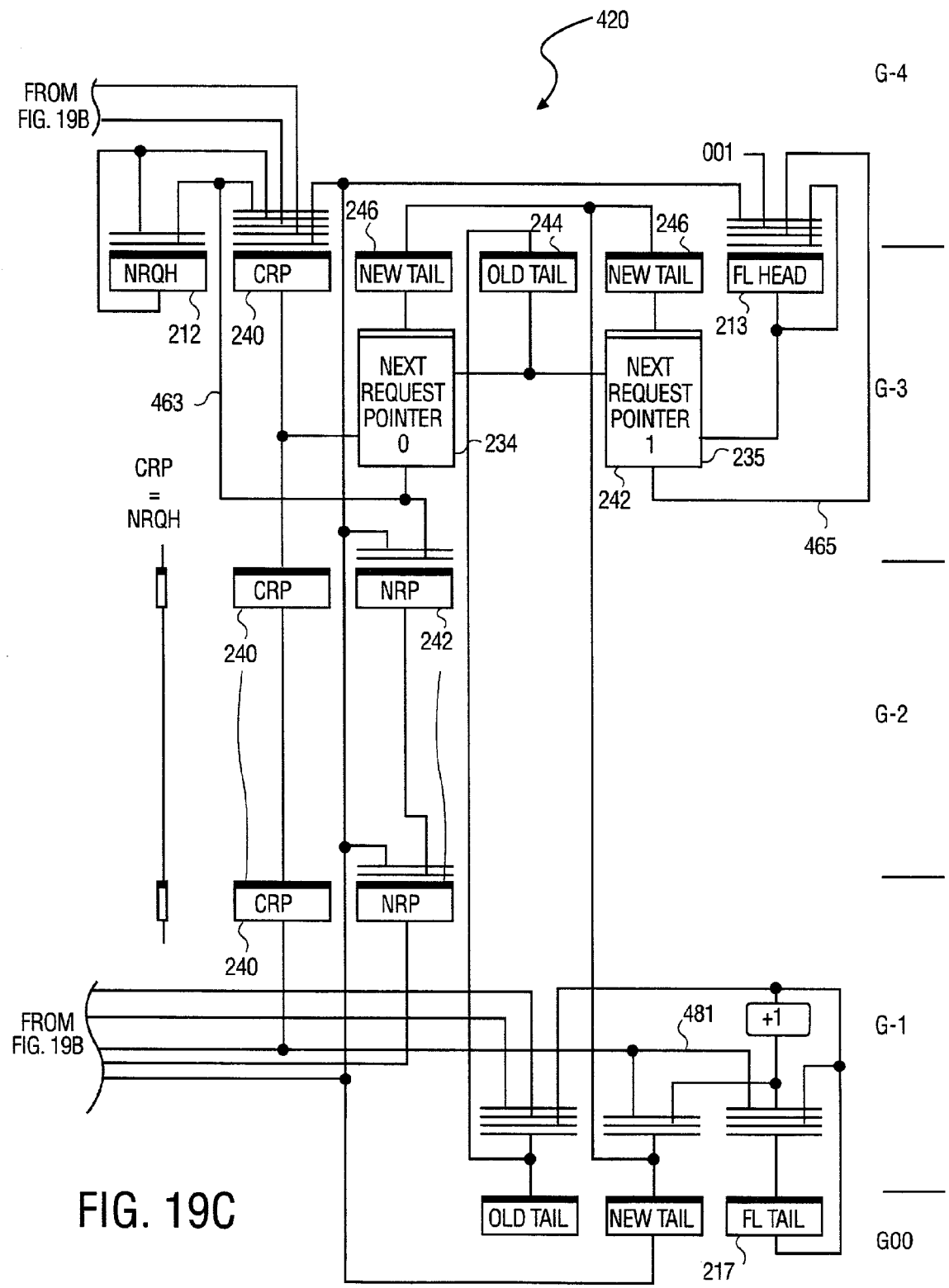

FIGS. 19A–19C provide a diagrammatic representation of a pointer pipeline 420, according to an exemplary embodiment, implemented within the resource allocator 40, and show the processing of the various pointers discussed above. The pointer pipeline 420 is again shown to include five pipestages 422–430, labeled the G00 to G-4 pipestages. The flowchart illustrated in FIGS. 20A–20C shows the operations performed at each of these respective pipestages.

Figure 20A:
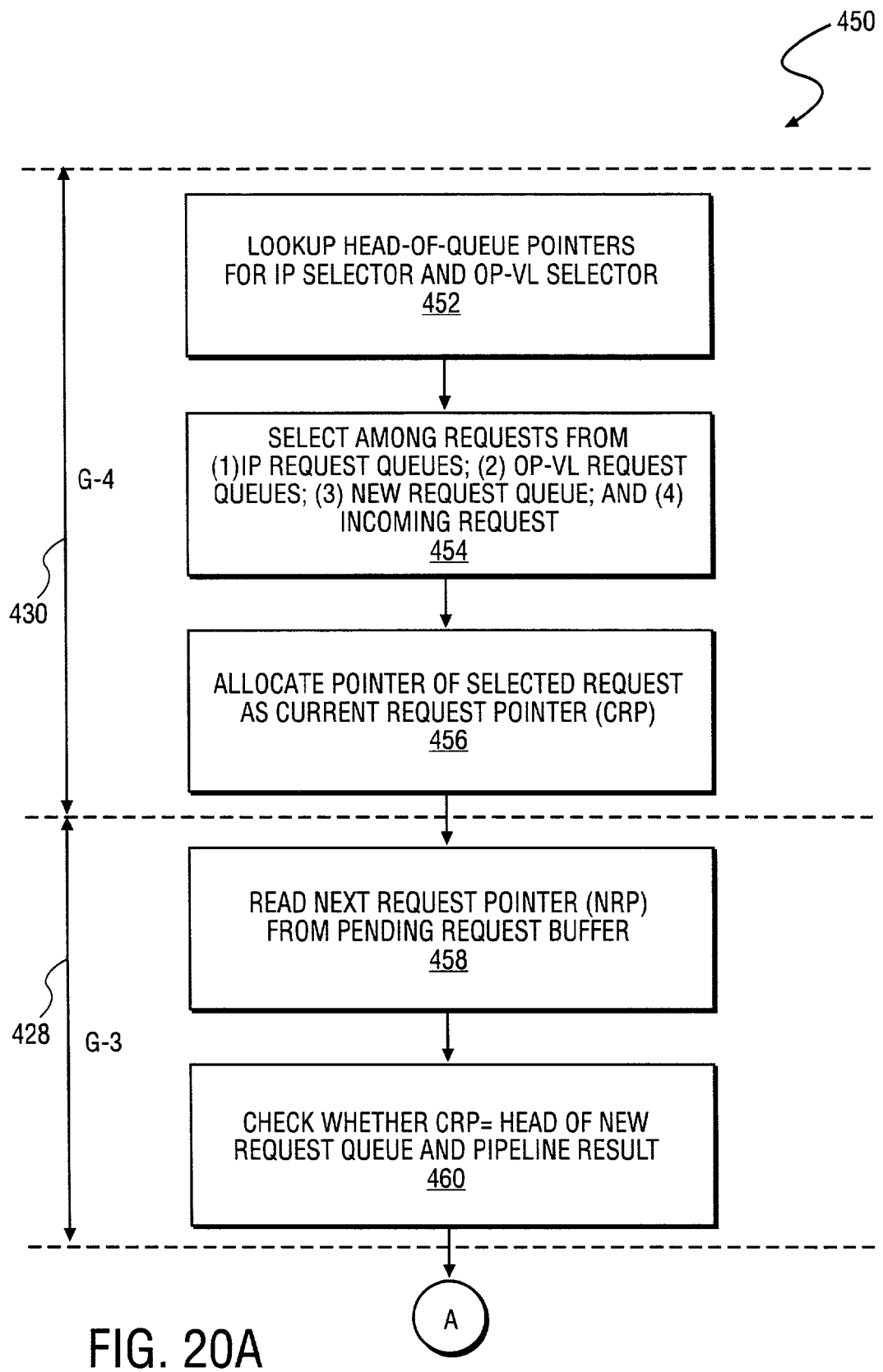
FIGS. 20A–20C show a flow chart illustrating operations, according to an exemplary embodiment of the present invention, performed at each of the respective pipestages illustrated in FIGS. 19A–19C.
Figure 20B:
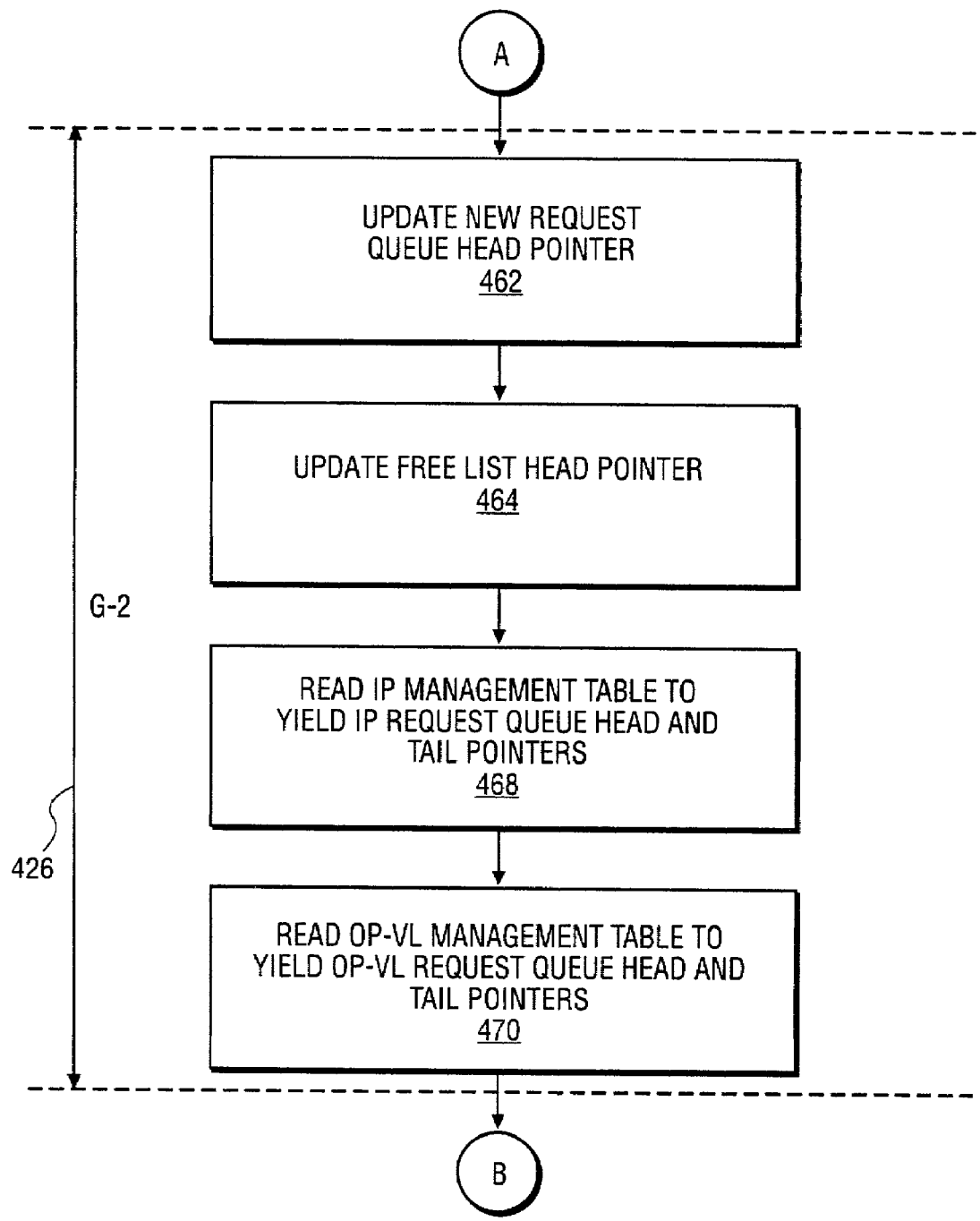
Figure 20C:
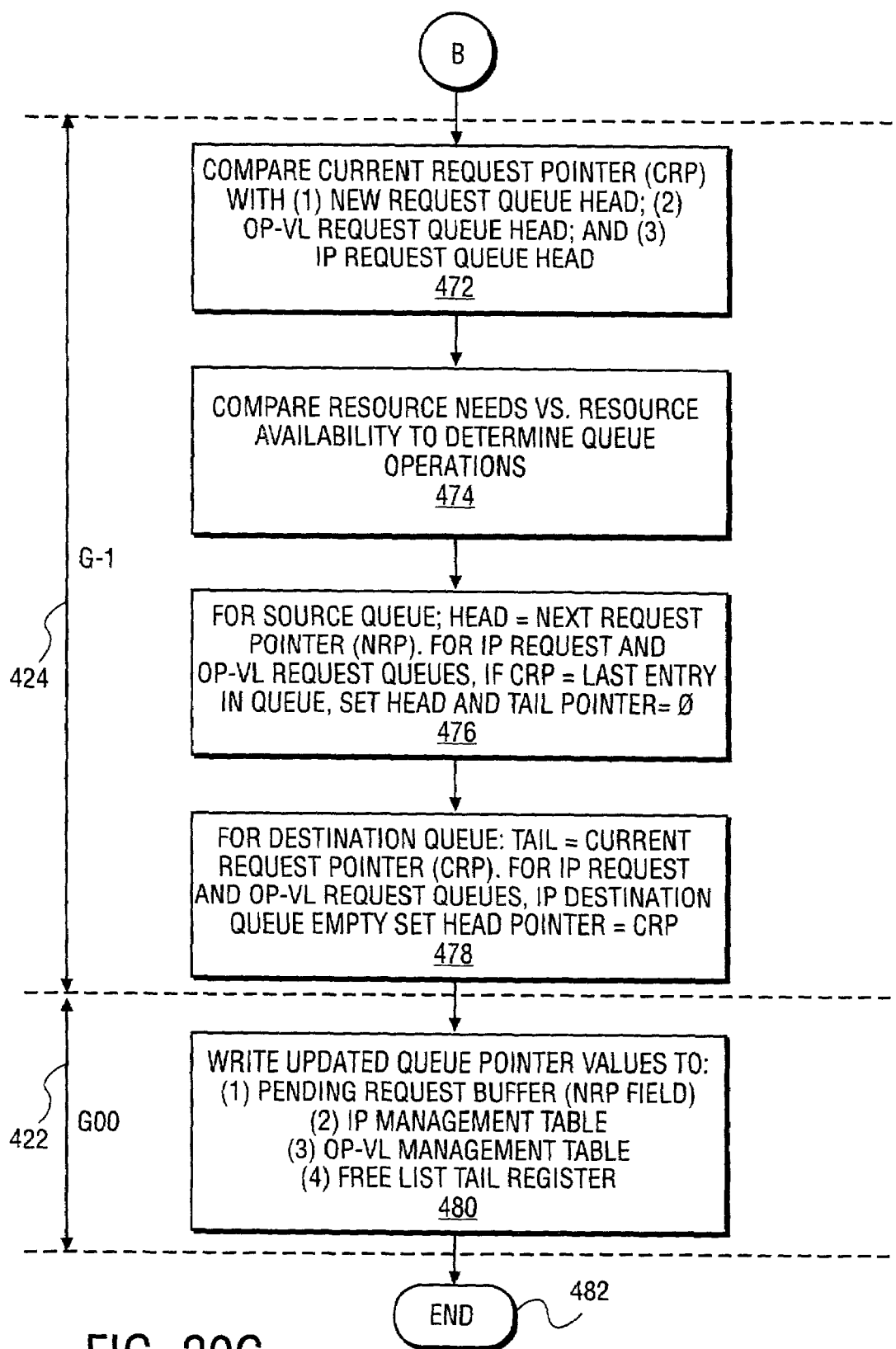

FIGS. 20A–20C illustrate a method 450, according to an exemplary embodiment, of processing a number of queue and request pointers identifying entries within a pending request buffer.

The method 450 commences at block 452 with a lookup of the head-of-queue pointers by the OP-VL request selector logic 162 and the IP request selector logic 164, illustrated in FIG. 5. This lookup is performed to read the addresses for the requests at the heads of a chosen OP-VL queue 170 and a chosen IP queue 172. FIGS. 19A and 19B illustrate the output of pointers to the head-of-queue requests from IP request queue hit pointer and OP-VL request queue head pointer tables 282 and 264.

At block 454, the OP-VL request selector logic 162 and the IP request selector logic 164, based on respective arbitration schemes, each present a respective request to the priority selector logic 156. The priority selector logic 156 then selects among candidate requests communicated to it from the IP request selector logic 164, the OP-VL request selector logic 162, the new request queue 154 and incoming requests 312.

At block 456, the pointer of the selected request is allocated as the current request pointer 240 as indicated in FIG. 19C.

As shown in FIG. 20A, the operations performed at blocks 452–456 are preformed within the G-4 pipestage 430.

Progressing to the G-3 pipestage 428, at block 458, the next request pointer (NRP) 242 is read from the pending request buffer 204 and more specifically from the SRAM 234.

At block 460, a determination is made as to whether the current request pointer (CRP) 240 points to the head of the new request queue. The result is pipelined.

Progressing now to FIG. 20B, which illustrates operations performed within the G-2 pipestage 426, at block 462, assuming that a new request from the new request queue 154 was transferred to a further queue (e.g., an OP-VL request queue 170 or an IP request queue 172), the new request queue head pointer is updated to point to the next request within the new request queue 154.

At block 464, the free list head pointer 213 is updated to account for the allocation of an incoming request 312 to the new request queue 154, as indicated at 463 in FIG. 19C.

At block 468, a read is performed on the IP management table 210, utilizing the input port identifier 140 as indicated in FIG. 19A of the current request, to yield the head and tail pointers 211 for the corresponding IP request queue 172.

At block 470, a read is performed on the OP-VL management table 208, utilizing the output port identifier 132 and the virtual lane identifier 134 for the current request, to yield the head and tail pointers 209 for the corresponding OP-VL request queue 170, as shown in FIG. 19B.

FIG. 20C illustrates operations performed during the G-1 pipestage 424 and the GOO pipestage 422 of the pointer pipeline 420, illustrated in FIGS. 19A–19C.

At block 472, the current request pointer 240 is compared with (1) the new request queue head pointer 212, (2) the OP-VL request queue head as determined at block 470, and (3) the IP request queue head as determined at block 468.

At block 474, the resource needs of the current request 316 are compared against the resource availability, in the manner described above with reference to blocks 344 and 352 of FIG. 15, to determine queue operations.

At block 476, for the source queue (i.e., any one of the queues 170, 172 or 154), the queue head is set to the next request pointer 242, which was read at block 458. If the source queue comprises an IP request queue 172 or an OP-VL request queue 170, and if the current request is the last entry within the relevant queue, the head and tail pointers for that queue will equal to null.

At block 478, for a destination queue (e.g., any of the destination queues indicated in FIG. 17), the tail pointer is set as equal to the current request pointer (CRP) 240. Again, if the destination queue is an IP request queue 172 or an OP-VL request queue 170, and if such a destination queue is empty, the head pointer is also set equal to the current request pointer (CRP) 240.

The list below shows the pointer updates for moving requests from one request queue to another. There are 13 cases. Note, for the OP-VL and IP request queues 170 and 172, the pointer updates depend on whether the last entry is being removed from the source queue and whether the destination queue is empty.

Pointer Updates in G-1 pipestage:

1. from the head of the new request queue 154 to an empty OP-VL request queue 170:
   G00_ORQ_Head=Gm1_CRP;
   G00_ORQ_Tail=Gm1_CRP;
   G00_IRQ_Head=Gm1_IRQ_Head;
   G00_IRQ_Tail=Gm1_IRQ_Tail;
   G00_FL_Tail=G00_FL_Tail; G00_Old_Tail=Null;
   G00_New_Tail=Null;

2. from the head of the new request queue 154 to the tail of a non-empty OP-VL request queue 170:
   G00_ORQ_Head=Gm1_ORQ_Head;
   G00_ORQ_Tail=Gm1_CRP;
   G00_IRQ_Head=Gm1_IRQ_Head;
   G00_IRQ_Tail=Gm1_IRQ_Tail;
   G00_FL_Tail=G00_FL_Tail;
   G00_Old_Tail=Gm1_ORQ_Tail;
   G00_New_Tail=Gm1_CRP;

3. from the head of the New Request queue to an empty IP Request queue:
   G00_ORQ_Head=Gm1_ORQ_Head;
   G00_ORQ_Tail=Gm1_ORQ_Tail;
   G00_IRQ_Head=Gm1_CRP;
   G00_IRQ_Tail=Gm1_CRP;
   G00_FL_Tail=G00_FL_Tail; G00_Old_Tail=Null;
   G00_New_Tail=Null;

4. from the head of the new request queue 154 to the tail of a non-empty IP request queue 172:
   G00_ORQ_Head=Gm1_ORQ_Head;
   G00_ORQ_Tail=Gm1_ORQ_Tail;
   G00_IRQ_Head=Gm1_IRQ_Head;
   G00_IRQ_Tail=Gm1_CRP;
   G00_FL_Tail=G00_FL_Tail;
   G00_Old_Tail=Gm1_IRQ_Tail;
   G00_New_Tail=Gm1_CRP;

5. from the head of the new request queue 154 to the tail of the free list 206:
   G00_ORQ_Head=Gm1_ORQ_Head;
   G00_ORQ_Tail=Gm1_ORQ_Tail;
   G00_IRQ_Head=Gm1_IRQ_Head;
   G00_IRQ_Tail=Gm1_IRQ_Tail;
   G00_FL_Tail=Gm1_CRP; G00_Old_Tail=G00_FL_Tail;
   G00_New_Tail=Gm1_CRP;

6. from the head of an OP-VL request queue 170 with more than one entry to an empty IP request queue 172:
   G00_ORQ_Head=Gm1_NRP;
   G00_ORQ_Tail=Gm1_ORQ_Tail;
   G00_IRQ_Head=Gm1_CRP;
   G00_IRQ_Tail=Gm1_CRP;
   G00_FL_Tail=G00_FL_Tail; G00_Old_Tail=Null;
   G00_New_Tail=Null;

7. from the head of an OP-VL request queue 170 with only one entry to an empty IP request queue 172:
   G00_ORQ_Head=Null; G00_ORQ_Tail=Null;
   G00_IRQ_Head=Gm1_CRP;
   G00_IRQ_Tail=Gm1_CRP;
   G00_FL_Tail=G00_FL_Tail; G00_Old_Tail=Null;
   G00_New_Tail=Null;

8. from the head of an OP-VL request queue 170 with more than one entry to a tail of a non-empty IP request queue 172:
   G00_ORQ_Head=Gm1_NRP;
   G00_ORQ_Tail=Gm1_ORQ_Tail;
   G00_IRQ_Head=Gm1_IRQ_Head;
   G00_IRQ_Tail=Gm1_CRP;
   G00_FL_Tail=G00_FL_Tail;
   G00_Old_Tail=Gm1_IRQ_Tail;

G00_New_Tail=Gm1_CRP;

9. from the head of an OP-VL request queue 170 with only one entry to the tail of a non-empty IP request queue 172:

G00_ORQ_Head=Null; G00_ORQ_Tail=Null;
G00_IRQ_Head=Gm1_IRQ_Head;
G00_IRQ_Tail=Gm1_CRP;
G00_FL_Tail=G00_FL_Tail;
G00_Old_Tail=Gm1_IRQ_Tail;
G00_New_Tail=Gm1_CRP;

10. from the head of an OP-VL request queue 170 with more than one entry to the tail of the free list 206:

G00_ORQ_Head=Gm1_NRP;
G00_ORQ_Tail=Gm1_ORQ_Tail;
G00_IRQ_Head=Gm1_IRQ_Head;
G00_IRQ_Tail=Gm1_IRQ_Tail;
G00_FL_Tail=Gm1_CRP; G00_Old_Tail=G00_FL_Tail;
G00_New_Tail=Gm1_CRP;

11. from the head of an OP-VL request queue 170 with only one entry to the tail of the free list 206:

G00_ORQ_Head=Null; G00_ORQ_Tail=Null;
G00_IRQ_Head=Gm1_IRQ_Head;
G00_IRQ_Tail=Gm1_IRQ_Tail;
G00_FL_Tail=Gm1_CRP; G00_Old_Tail=G00_FL_Tail;
G00_New_Tail=Gm1_CRP;

12. from the head of an IP request queue 172 with more than one entry to the tail of the free list 206:

G00_ORQ_Head=Gm1_ORQ_Head;
G00_ORQ_Tail=Gm1_ORQ_Tail;
G00_IRQ_Head=Gm1_NRP;
G00_IRQ_Tail=Gm1_IRQ_Tail;
G00_FL_Tail=Gm1_CRP; G00_Old_Tail=G00_FL_Tail;
G00_New_Tail=Gm1_CRP;

13. from the head of an IP request queue with only one entry to the tail of the free list 206:

G00_ORQ_Head=Gm1_ORQ_Head;
G00_ORQ_Tail=Gm1_ORQ_Tail;
G00_IRQ_Head=Null; G00_IRQ_Tail=Null;
G00_FL_Tail=Gm1_CRP; G00_Old_Tail=G00_FL_Tail;
G00_New_Tail=Gm1_CRP.

Moving onto the GOO pipestage 422, at block 480, updated queue values are written to appropriate locations. Specifically, the next request pointer field 224 and 226 is written to the pending request buffer 204, updated queue pointers for the relevant queue (or queues) are written to the IP management table 210, head and tail pointers for the appropriate queue (or queues) are written to the OP-VL management table 208, and the current request pointer is written to a free list tail register, as indicated at 481 in FIG. 19C, to add an entry to the free list 206 for a just-granted request 313.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, method and system to manage resource requests within an arbiter associated with an interconnect device, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to manage a-resource requests within an arbiter associated with an interconnect device, the method including:

identifying first and second resources required to issue a grant responsive to a resource request, the first and second resources being of a first resource type and a second resource type, respectively;

placing the resource request within a first resource type queue when the first resource is unavailable;

placing the resource request within a second resource type queue when the first resource is available and the second resource is unavailable;

implementing a first selection scheme to select a resource request for processing from the first resource type queue based on availability of the first resource type, and implementing a second selection scheme to select a resource request for processing from the second resource type queue based on availability of the second resource type;

implementing a priority scheme between the first and second selection schemes to prioritize processing of the selected resource requests; and issuing the grant upon availability of both the first and second resources.

2. The method of claim 1 further comprising placing the resource request within a pending request buffer.

3. The method of claim 2 further comprising maintaining a new request queue within the pending request buffer, wherein the resource request is placed within the new request queue prior to determining whether the first resource is available.

4. The method of claim 3 wherein the new request queue is maintained as a link within the pending request buffer.

5. The method of claim 2 further comprising maintaining a free list of entries within the pending request buffer that are not allocated to resource requests, and that are available for allocation to an incoming resource request.

6. The method of claim 1 further comprising recording respective head and tail pointers for each queue within an entry within a management table structure.

7. The method of claim 1 further comprising allocating the first resource to the resource request if the first resource is available but the second resource is unavailable.

8. The method of claim 1 further comprising not allocating the second resource to the resource request if the first resource is unavailable but the second resource is available.

9. The method of claim 1 wherein, if all resources required to issue a grant responsive to the resource request are available, then processing the resource request without queuing the resource request within a queue of the first and second groups of resource type queues.

10. A queue system to manage resource requests within an arbiter associated with an interconnect device, the queue system comprising:
 a memory, associated with the arbiter, to maintain first and second groups of resource type queues of requests for which first and second resource types respectively are outstanding;
 a resource allocator to identify first and second resources required to issue a grant responsive to a resource request, the first and second resources being of a first resource type and a second resource type, respectively, to place the resource request within a first resource type queue when the first resource is unavailable, to place the resource request within a second resource type queue when the first resource is available and the second resource is unavailable, and to issue the grant upon availability of both the first and second resources;
 a first selector to implement a first selection scheme to select a resource request for processing from the first group of resource type queues based on availability of the first resource type;
 a second selector to implement a second selection scheme to select a resource request for processing from the second group of resource type queues based on availability of the second resource type; and
 a priority selector to implement a priority scheme between the first and second selection schemes.

11. The queue system of claim 10 wherein the first or the second resource type each comprise at least one of: an input port, an output port, a virtual lane, a crossbar path, an input buffer of an input port, an output buffer of an output port, and an input buffer of a destination input port.

12. The queue system of claim 10 further comprising a pending request buffer into which the resource request is placed, wherein each queue of the first and second groups of resource type queues is maintained as a linked list within the pending request buffer.

13. The queue system of claim 12 wherein the pending request buffer is implemented within the memory associated with the arbiter.

14. The queue system of claim 12 further comprising a management table structure maintained within the memory, wherein the maintenance of each queue of the first and second groups of resource type queues includes recording respective head and tail pointers for each resource type queue within a respective entry within the management table structure.

15. The queue system of claim 14 wherein at least one entry associated with a resource type queue in the management table structure includes at least one of: a volume indication of data issued to the resource, an availability indication associated with the resource, and a head-of-queue age indication.

16. The queue system of claim 12 wherein the management table structure includes a first management table including respective entries for each queue of the first group of resource type queues, and a second management table including respective entries for each queue of the second group of resource type queues.

17. The queue system of claim 12 wherein the management table structure is implemented within the memory associated with the arbiter.

18. The queue system of claim 10 wherein the resource allocator is configured to allocate the first resource to the resource request if the first resource is available but the second resource is unavailable.

19. The queue system of claim 10 wherein the resource allocator is configured to not allocate the second resource to the resource request if the first resource is unavailable but the second resource is available.

20. The queue system of claim 10 wherein the resource allocator, if all resources required to issue a grant responsive to the resource request are available, is configured to process the resource request without queuing the resource request within a queue of the first and second groups of queues.

21. The queue system of claim 10 further comprising a new request queue maintained within the pending request buffer, wherein the resource request is placed within the new request queue prior to determining whether the first resource is available.

22. The queue system of claim 21 wherein the new request queue is maintained as a link within the pending request buffer.

23. The queue system of claim 10 further comprising a free list of entries maintained within the pending request buffer that are not allocated to resource requests, and that are available for allocation to an incoming resource request.

24. The queue system of claim 10 wherein the interconnect device includes any of a group of devices including a switch, a router, a repeater, and an adapter.

* * * * *